United States Patent [19]
Ishizuka et al.

[11] Patent Number: 5,848,194
[45] Date of Patent: Dec. 8, 1998

[54] CODING/DECODING APPARATUS AND CODING/DECODING METHOD

[75] Inventors: Keiji Ishizuka, Kawasaki; Tsutomu Ando, Zama; Koji Aoki, Kamakura; Susumu Igarashi, Atsugi, all of Japan

[73] Assignee: Canon Kabushiki Kaisha, Tokyo, Japan

[21] Appl. No.: 573,533

[22] Filed: Dec. 15, 1995

[30] Foreign Application Priority Data

| Dec. 16, 1994 | [JP] | Japan | 6-313700 |
| Dec. 22, 1994 | [JP] | Japan | 6-320945 |
| Mar. 17, 1995 | [JP] | Japan | 7-058469 |
| Sep. 6, 1995 | [JP] | Japan | 7-228982 |
| Nov. 8, 1995 | [JP] | Japan | 7-290063 |

[51] Int. Cl.$^6$ .................................. H04N 1/417
[52] U.S. Cl. .................. 382/234; 352/247; 358/261.2; 358/261.4; 358/430
[58] Field of Search .................. 382/247, 244, 382/234, 238; 358/426, 261.2, 261.4, 430; H04N 1/417

[56] References Cited

U.S. PATENT DOCUMENTS

| 4,215,374 | 7/1980 | Mizuno | 358/430 |
| 4,470,072 | 9/1984 | Tanaka et al. | 358/260 |
| 5,262,873 | 11/1993 | Ishizuka et al. | 358/443 |
| 5,379,355 | 1/1995 | Allen | 382/56 |
| 5,381,145 | 1/1995 | Allen et al. | 358/426 |
| 5,418,863 | 5/1995 | Ando | 382/56 |
| 5,422,734 | 6/1995 | Kang | 358/429 |
| 5,577,132 | 11/1996 | Yokose et al. | 382/238 |
| 5,594,813 | 1/1997 | Fandrianto et al. | 382/236 |
| 5,689,589 | 11/1997 | Gormish et al. | 382/239 |

FOREIGN PATENT DOCUMENTS 56-156072  12/1981  Japan ............... H04N 1/40

OTHER PUBLICATIONS

"Review of Standards For Electronic Imaging For Facsimile Systems", S.J. Urban, Journal of Electronic Imaging, vol. 1, No. 1, 1992, US, pp. 5–21, XP000323323.

*Primary Examiner*—Kim Yen Vu
*Attorney, Agent, or Firm*—Fitzpatrick, Cella, Harper & Scinto

[57] ABSTRACT

Address information generated and output by an address converter for each pixel of input image data in accordance with the phase based on the position of the pixel to be coded is stored in an address storage divided into address groups which are periodically referred to. Information indicative of the occurrence probability of the pixel to be coded and phase information of the pixel are selectively output from the address storage, and an arithmetic coding is performed for the output. During the processing, update data is written in to one group while a read-out is being performed for the other group. A template is constituted by excluding a pixel which predeses one pixel, and a prediction state in each phase is divided into two parts. The template output is applied to both of the divided storage devices, and read actions are independently performed.

30 Claims, 28 Drawing Sheets

PHASE 0

PHASE 1

PHASE 2

PHASE 3

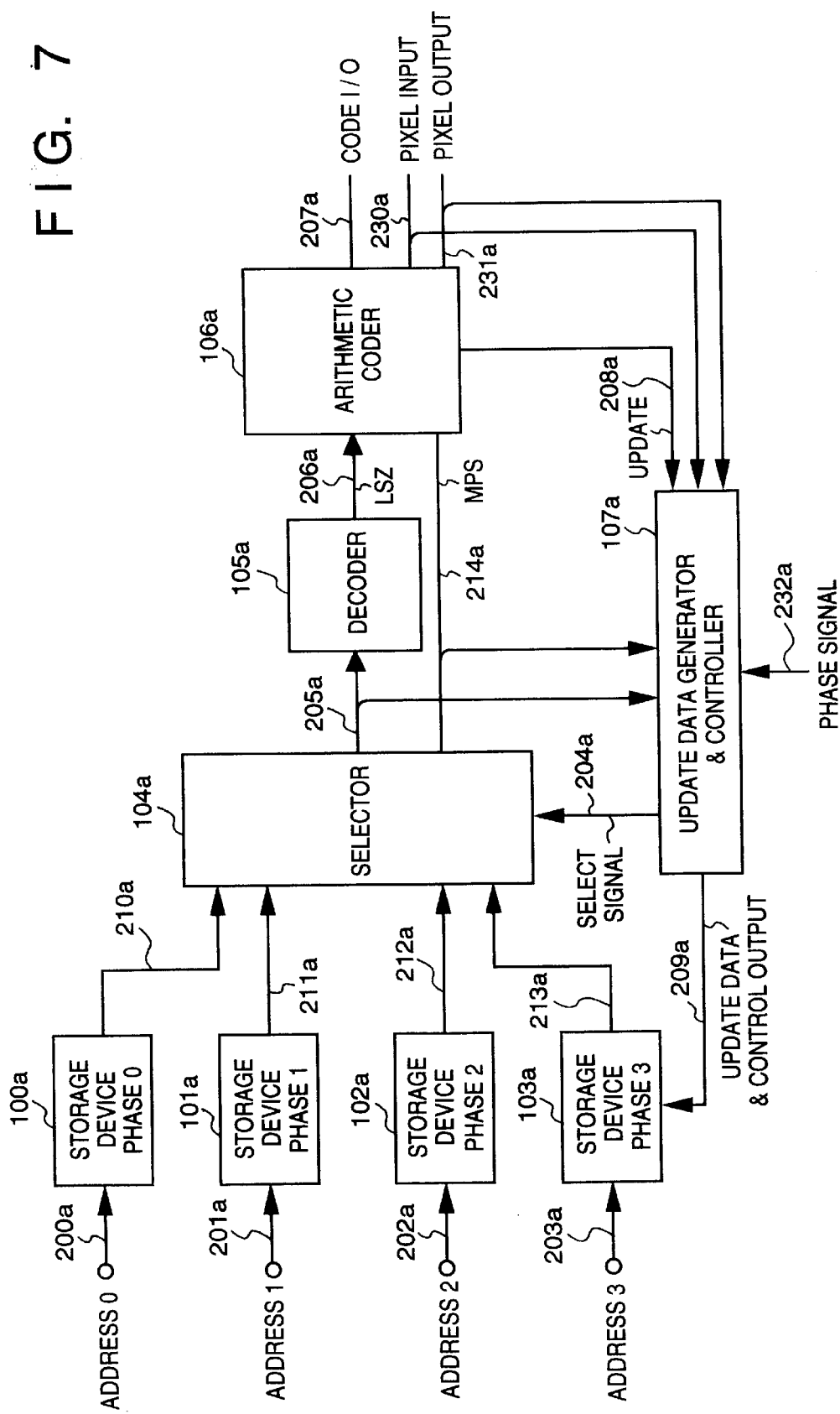

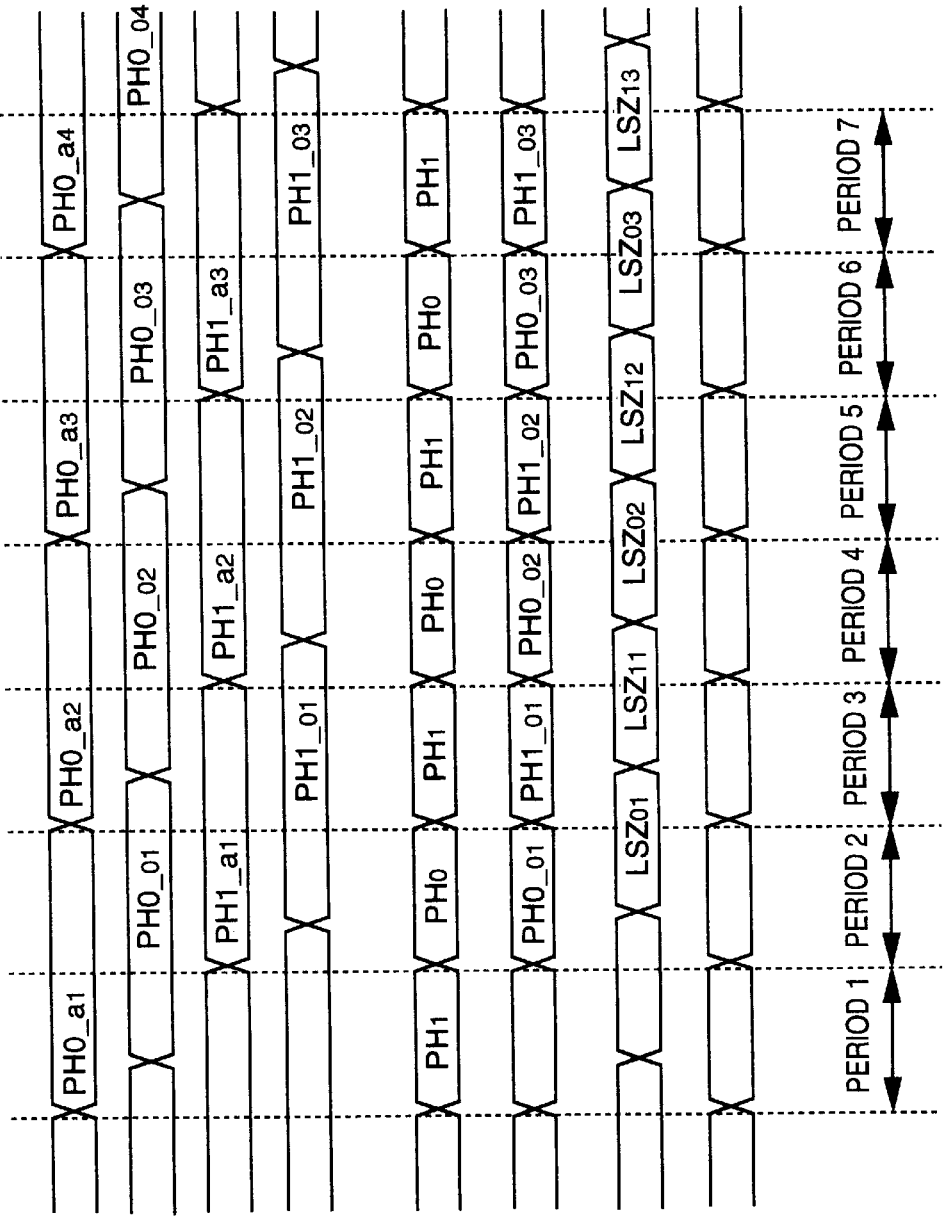

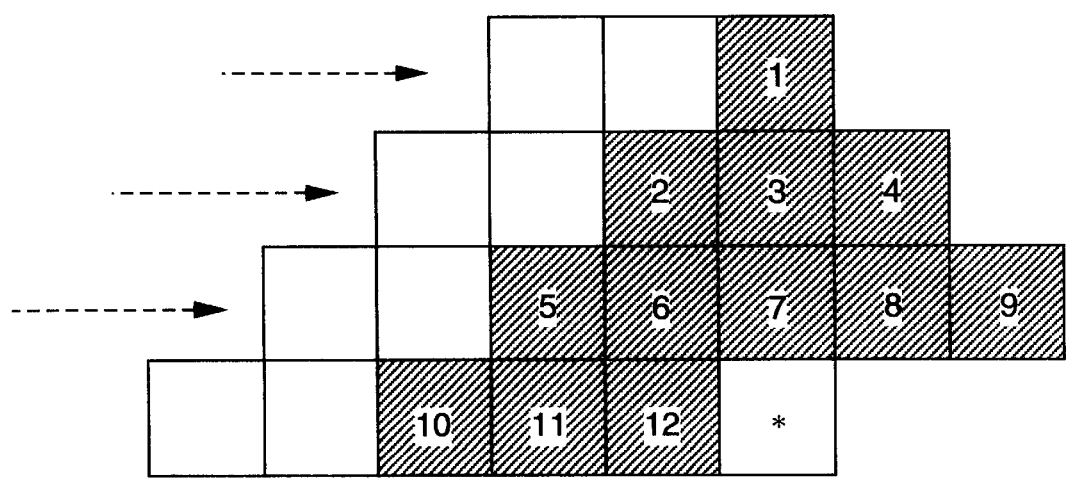
F I G. 18

FIG. 22

| | 302 | 301 | 300 | |
|---|---|---|---|---|
| 307 | 306 | 305 | 304 | 303 |
| 309 | 308 | 310 | | |

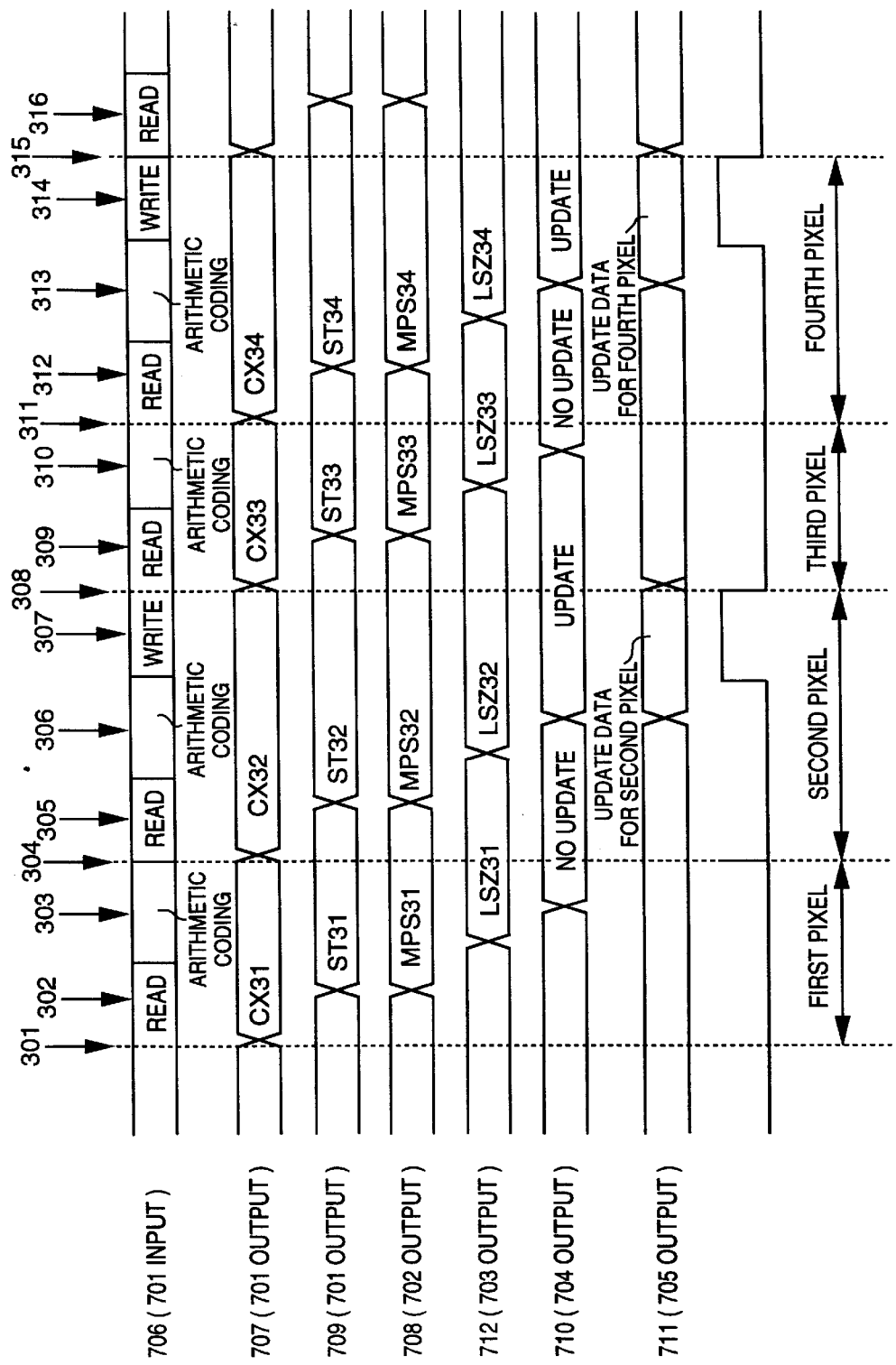

CODING/DECODING APPARATUS AND CODING/DECODING METHOD

BACKGROUND OF THE INVENTION

The present invention relates to a coding/decoding apparatus and a coding/decoding method, e.g., a coding/decoding apparatus and a coding/decoding method which perform data compression by using predictive coding/decoding or perform coding and decoding by using an access method of a storage device.

The recent development of image processors is notable, and many image processors capable of processing color images are being produced. Especially in the color image processing technologies, a technique of coding/decoding image data is important because a vast quantity of data is processed.

Various methods have been proposed and put into practical use as the image data coding methods. Among other coding methods, an arithmetic coding method is useful in that it is relatively easily possible to perform dynamic adaptation in which the coding parameters are dynamically changed to be adapted to the local characteristics of a current pixel information source while coding is being performed. That is, in a system which handles images with various characteristics or in a system which handles an image whose statistical characteristics are largely different in different portions of the image, it is very effective to be able to perform efficient coding with the same algorithm. For example, local statistical characteristics are estimated from already coded pixels, and the coding parameters are changed on the basis of the estimated characteristics. This makes dynamic adaptation feasible.

The arithmetic coding method will be described below with reference to the accompanying drawings.

As described in ISO/IEC Committee Draft 11544, in the conventional arithmetic coding method, a probability number line is divided into sections in accordance with the occurrence probability of a symbol sequence, and a binary decimal number indicative of a position in the divided section is used as a code corresponding to the sequence. That is, coding is performed in accordance with the occurrence probability of each pixel. Estimation of the occurrence probability of each pixel is realized by a learning function which is properly updated in accordance with the occurrence process of each pixel.

FIG. 3 shows an example of the configuration of a conventional arithmetic coding apparatus. Referring to FIG. 3, a scanner 109$p$ inputs image data, and an address converter 111$p$ converts each pixel of the image data into corresponding address information 103$p$ of an address storage 100$p$ (described below). The address storage 100$p$ stores arithmetic parameter information 107$p$ indicating address information of an arithmetic parameter ROM 106$p$ and estimation symbol information 105$p$. The arithmetic ROM 106$p$ prestores an occurrence probability 104$p$ corresponding to an arithmetic parameter (address). An arithmetic coder 101$p$ performs arithmetic coding on the basis of the occurrence probability 104$p$ and the estimation symbol information 105$p$, and outputs coded data 102$p$.

The input address information 103$p$ to the address storage 100$p$ is address data for reading out arbitrary ones of the arithmetic parameter information 107$p$ and the estimation symbol information 105$p$. The contents (the arithmetic parameter information 107$p$ and the estimation symbol information 105$p$) of the address storage 100$p$ are updated by update data 108$p$ from a controller 112$p$.

The method by which the address converter 111$p$ determines the address information 103$p$ will be described below with reference to FIGS. 4A and 4B.

In FIG. 4A, each square represents one binary pixel, and each circle spreading over four pixels indicates a pixel formed by reducing these four pixels on the basis of a predetermined reducing algorithm. Note that for the sake of explanation, the binary pixels are denoted by reference characters h11 to h16, h21 to h26, and h31 to h36 and the reduced pixels are denoted by reference characters L11 to L13 and L21 to L23.

In FIG. 4A, assume that the pixel h13 is a pixel to be coded. Arithmetic coding is performed on the basis of the type of symbol of the pixel h13 and the occurrence probability of that symbol. Each estimation for the pixel h13 is done in accordance with the past occurrence situation, and it is realized by referring to the individual pixels (symbols) surrounding the pixel h13.

For example, the address information 103$p$ is constituted by six pixels (h11, h12, h22 to h24, and h33), which are pixels except for the pixel h13 in a region enclosed by the thick lines, plus four reduced pixels (L11, L12, L21, and L22).

In accordance with the arbitrary and independent address information 103$p$ constituted by these pixels, a given address in the address storage 100$p$ can be designated and read out.

Note that each pixel is a binary pixel in FIG. 4A, so the address information 103$p$ can take $2^{10}$ values, i.e., 1024 values.

FIG. 4B illustrates the positions of pixels when the pixel h14 is a pixel to be coded, unlike the case shown in FIG. 4A. That is, FIG. 4A illustrates the pixel positions when the pixel h13 at the upper left portion of the reduced pixel L22 is to be coded, whereas FIG. 4B shows the pixel positions when the pixel h14 at the upper right portion of the reduced pixel L22 is to be coded.

In FIG. 4B, the relative positional relationship between pixels to be referred to in order to estimate the symbol and the occurrence probability of the pixel h14 is different from that shown in FIG. 4A. In FIG. 4B, to estimate the symbol and the occurrence probability of the pixel h14, the peripheral pixels h12, h13, h23 to h25, h34, L12, L13, L22, and L23 enclosed by the thick lines are referred to. The pixels to be referred to change in accordance with the relative positional relationship between the reduced pixel, such as the pixel L22, and the pixel to be coded, because only one reduced pixel exists with respect to four pixels before reduction.

A case in which the pixel to be coded has the positional relationship as illustrated in FIG. 4A will be referred to as phase 0, and a case in which the pixel to be coded has the positional relationship as illustrated in FIG. 4B will be referred to as phase 1.

Accordingly, the input address information 103$p$ to the address storage 100$p$ needs to contain not only the address defined by the reference pixels described above but phase information (phase 0 or 1).

The procedure of the conventional arithmetic coding will be described below with reference to FIG. 3.

Image data read by the scanner 109$p$ is input to the address converter 111$p$. The address converter 111$p$ forms the address information 103$p$ for each pixel on the basis of the pixel value and the phase information and inputs the address information 103$p$ to the address storage 100$p$. In accordance with the input address information 103*p*, the address storage 100*p* outputs the arithmetic parameter information 107*p* to the arithmetic parameter ROM 106*p* and the estimation symbol information 105*p* to the arithmetic coder 101*p*. From the arithmetic parameter information 107*p*, the arithmetic parameter ROM 106*p* outputs the occurrence probability 104*p* corresponding to a pixel to be coded. On the basis of the estimation symbol information 105*p* and the occurrence probability 104*p*, the arithmetic coder 101*p* performs arithmetic coding and properly outputs the coded data 102*p*.

When detecting that the compression ratio in the arithmetic coder 101*p* is decreased, the controller 112*p* outputs the update data 108*p* for updating the estimation symbol information 105*p* and the arithmetic parameter information 107*p* stored in the address storage 100*p*, in order to increase the compression ratio. Consequently, the address storage 100*p* is updated on the basis of the update data 108*p* to prepare for coding of the next pixel; i.e., learning can be performed. The update data 108*p* is written in accordance with an address indicated by the address information 103*p* to the address storage 100*p*.

Arithmetic coding for a stream of pixels is performed by repeating the above processing.

FIG. 24 is a block diagram showing the configuration of a conventional image processor.

To read out an estimate of each pixel, CX 1405 is input as an address to a storage device 1401, as shown in FIG. 24. From this storage device 1401, ST 1406 as a prediction state value and MPS 1408 as a prediction symbol are read out. The ST 1406 is applied to a decoder 1402 and an update data generator 1404. The MPS 1408 is applied to the update data generator 1404 and an arithmetic coder/decoder 1403.

The decoder 1402 converts the ST 1406 into LSZ 1407 as an occurrence probability. The LSZ 1407, the MPS 1408, and PIX 1411 as a pixel to be coded are applied to the arithmetic coder/decoder 1403. On the basis of the LSZ 1407, the MPS 1408, and the PIX 1411, the arithmetic coder/decoder 1403 performs coding and outputs an update signal 1410.

The update signal 1410 is input to the update data generator 1404, and update data 1409 as the output from the generator 1404 is input to the storage device 1401 each time a pixel is coded. The update data 1409 is written in the storage device 1401 for each pixel by a WRITE signal 1412.

Pixel processing in a case where the first pixel requires no update and the second pixel requires update will be described below with reference to a timing chart shown in FIG. 25.

<Conventional processing for first pixel>

At time 601 in FIG. 25, READ processing 602 as read processing for the storage device 1401 is started, and CX61 as a reference pixel value required to code the first pixel is input to the storage device 1401. ST61 and MPS61 are read out from the storage device 1401. The decoder 1402 converts the ST61 into LSZ61 and applies the LSZ61 to the arithmetic coder/decoder 1403.

By using the LSZ61, the MPS61, and the PIX61, the arithmetic coder/decoder 1403 performs arithmetic coding 603 and outputs the update signal 1410 to the update data generator 1404. Since the update signal 1410 indicates that the pixel currently being processed requires "no update", the update data generator 1404 outputs the ST61 and the MPS61 as the update data 1409. The WRITE signal 1412 (which performs a write action when the logic level is HIGH in this example) writes the update data 1409 into the storage device 1401 during a WRITE processing period 604.

<Conventional processing for second pixel>

At time 605 in FIG. 25, READ processing 606 for the storage device 1401 is started, and CX62 necessary for coding of the second pixel is input to the storage device 1401. ST62 and MPS62 are read out from the storage device 1401. The decoder 1402 converts the ST62 into LSZ62 and applies the LSZ62 to the arithmetic coder/decoder 1403.

By using the LSZ62, the MPS62, and the PIX62, the arithmetic coder/decoder 1403 performs arithmetic coding 607 and outputs the update signal 1410 to the update data generator 1404. Since the update signal 1410 indicates that the pixel currently being processed requires "update", the update data generator 1404 generates and outputs update data. The WRITE signal 1412 writes the update data 1409 into the storage device 1401 during a WRITE processing period 608.

In the same fashion as above, if update for the storage device 1401 is not necessary, the ST 1406 and the MPS 1408 used for a pixel currently being processed are directly written in the storage device 1401, as in the case of the first pixel. If update is necessary, the update data generator 1401 newly generates update data 1409 and writes the data in the storage device 1401.

Furthermore, the conventional coding apparatuses using common predictive coding have the following problems.

1. A read and/or write action with respect to a prediction state memory is performed in coding processing for each pixel. Accordingly, the coding rate is limited by the access speed of the memory.

2. The read and write actions described above are necessarily done for the same address in the prediction state memory. Therefore, the read and write actions need to be completed before each subsequent pixel to be coded is processed. This prevents the processing speed from being increased.

SUMMARY OF THE INVENTION

It is an object of the present invention to provide a coding/decoding apparatus and a coding/decoding method capable of performing coding at a high speed and a low cost by updating the contents of one of divided storage devices for estimating the occurrence probability of each divided pixel to be coded, while reading out the stored contents from the other.

It is another object of the present invention to provide a coding/decoding apparatus and a coding/decoding method capable of performing decoding at a high speed with ease without lowering the decoding rate compared to the coding rate.

It is still another object of the present invention to provide a coding/decoding apparatus and a coding/decoding method capable of performing coding and decoding at a high speed with a simple construction.

It is still another object of the present invention to provide a coding/decoding apparatus and a coding/decoding method capable of efficiently performing coding and decoding by writing update data for a preceding pixel to be processed and at the same time reading out a prediction state value for a current pixel to be processed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are views each showing the positional relationship between a pixel to be coded and reference pixels in the conventional coding apparatus;

FIG. 7 is a block diagram showing the configuration of a coding/decoding apparatus according to the second modification;

FIG. 8 is a timing chart showing the operation of the coding/decoding apparatus according to the second modification;

FIG. 18 is a view showing an example of a template;

FIG. 22 is a view showing the arrangement of reference pixels according to the sixth embodiment;

FIG. 28 is a timing chart showing the operation of the processor according to the seventh embodiment.

DETAILED DESCRIPTION OF THE PREFERRED EMBODIMENTS

The characteristic feature of the present invention is that an address storage for storing data for specifying, e.g., an estimation symbol and an occurrence probability is divided into address groups which are periodically referred to so that update data can be written in one group while another group is being read.

Embodiments according to the present invention will be described below with reference to the accompanying drawings.

<First Embodiment>

Figures 4A, 4B:
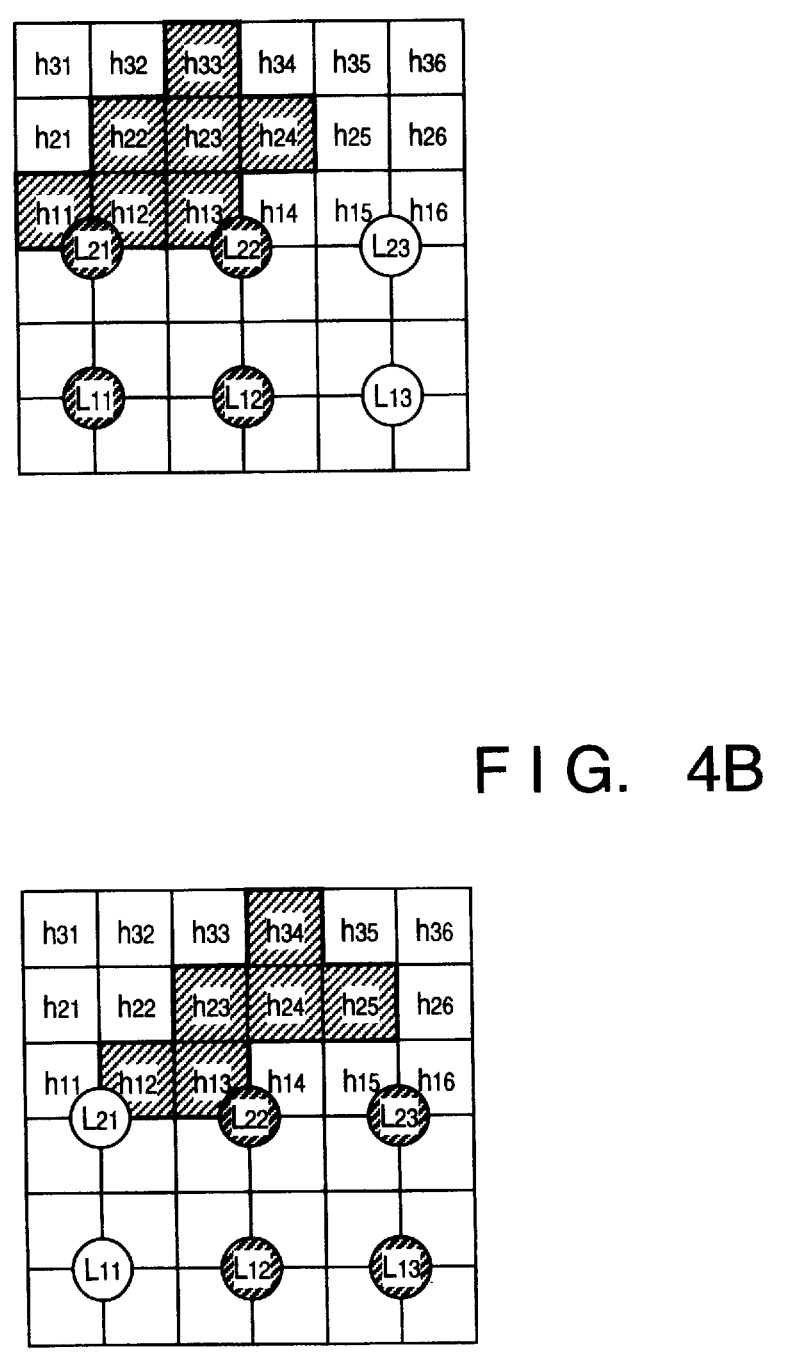

In arithmetic coding of this embodiment, the peripheral pixels referred to in order to code the pixel to be coded are the same as in FIG. 4. Accordingly, two types of phases, phase 0 and phase 1, are assumed.

Figure 1:
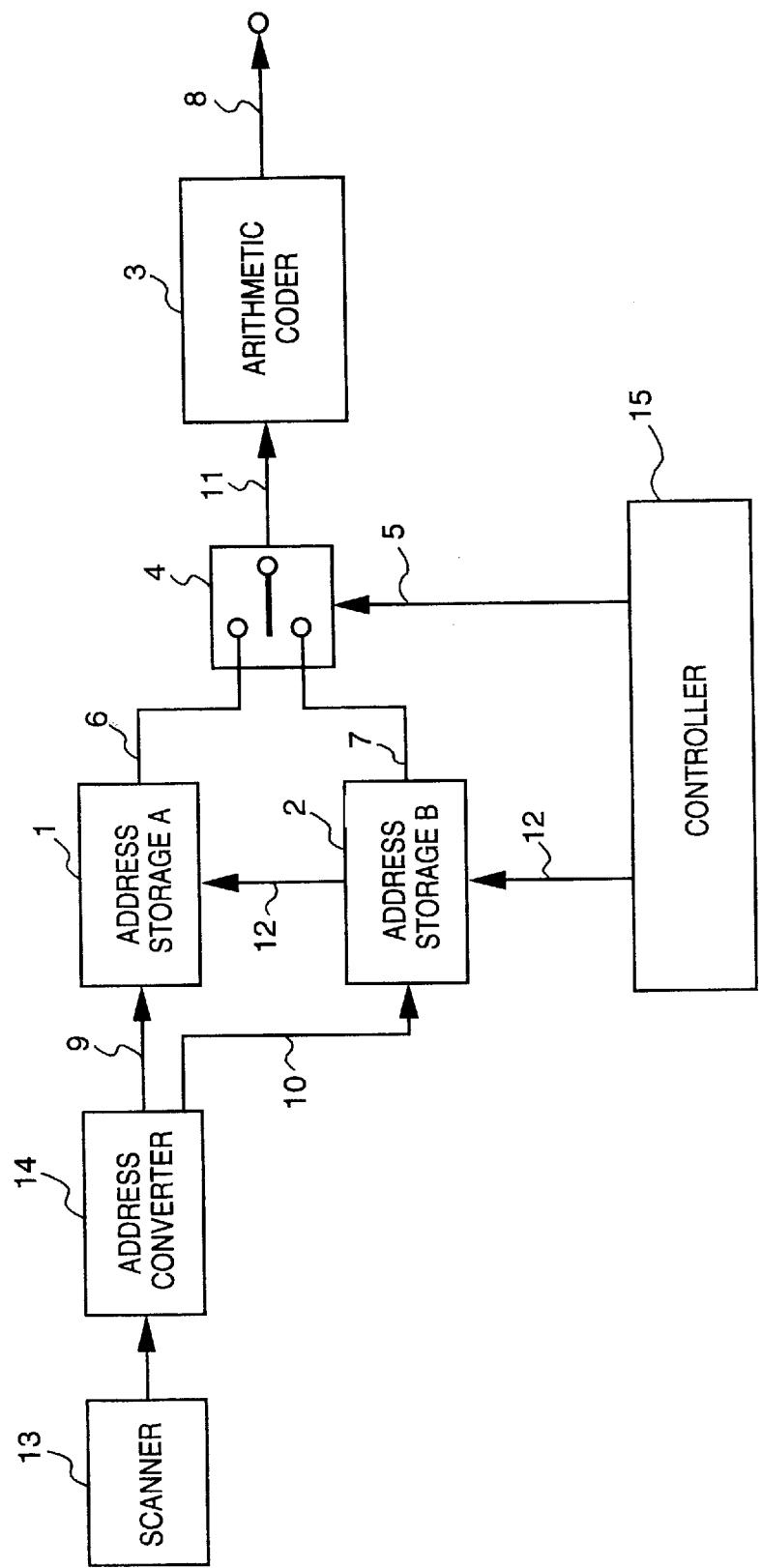
FIG. 1 is a block diagram showing an example of the configuration of a coding apparatus according to the first embodiment of the present invention.

FIG. 1 is a block diagram showing a coding apparatus of this embodiment.

Referring to FIG. 1, a scanner 13 inputs image data, and an address converter 14 generates address information 9 and 10 corresponding to the two different phases described above for each pixel of the input image data. Note that the image input device 13 is not particularly restricted to a scanner as long as the device can input image data.

Reference numeral 1 denotes an address storage A for processing pixels in phase 0; 2, an address storage B for processing pixels in phase 1; 3, an arithmetic coder; and 4, a selector. Assume the arithmetic coder 3 includes an arithmetic parameter ROM which stores occurrence probabilities.

The address storage A1 receives the address information 9 when the pixel to be coded is in the phase 0 and outputs information indicating the occurrence probability of the pixel and phase information, as a signal 6. Analogously, the address storage B2 receives the address information 10 when the pixel to be coded is in the phase 1 and outputs information indicating the occurrence probability of the pixel and phase information, as a signal 7.

The output signals 6 and 7 from the address storages A1 and B2 are applied to the selector 4. The selector 4 selects one of these signals in accordance with a control signal 5 from a controller 15 and outputs the selected signal as a signal 11. The output signal 11 (signal 6 or 7) from the selector 4 is applied to the arithmetic coder 3, and the arithmetic coder 3 performs well-known arithmetic coding and outputs coded data 8.

The contents in addresses indicated by the address information 9 and 10 of the address storages A1 and B2 can be updated by update data 12 from the controller 15.

Figure 2:
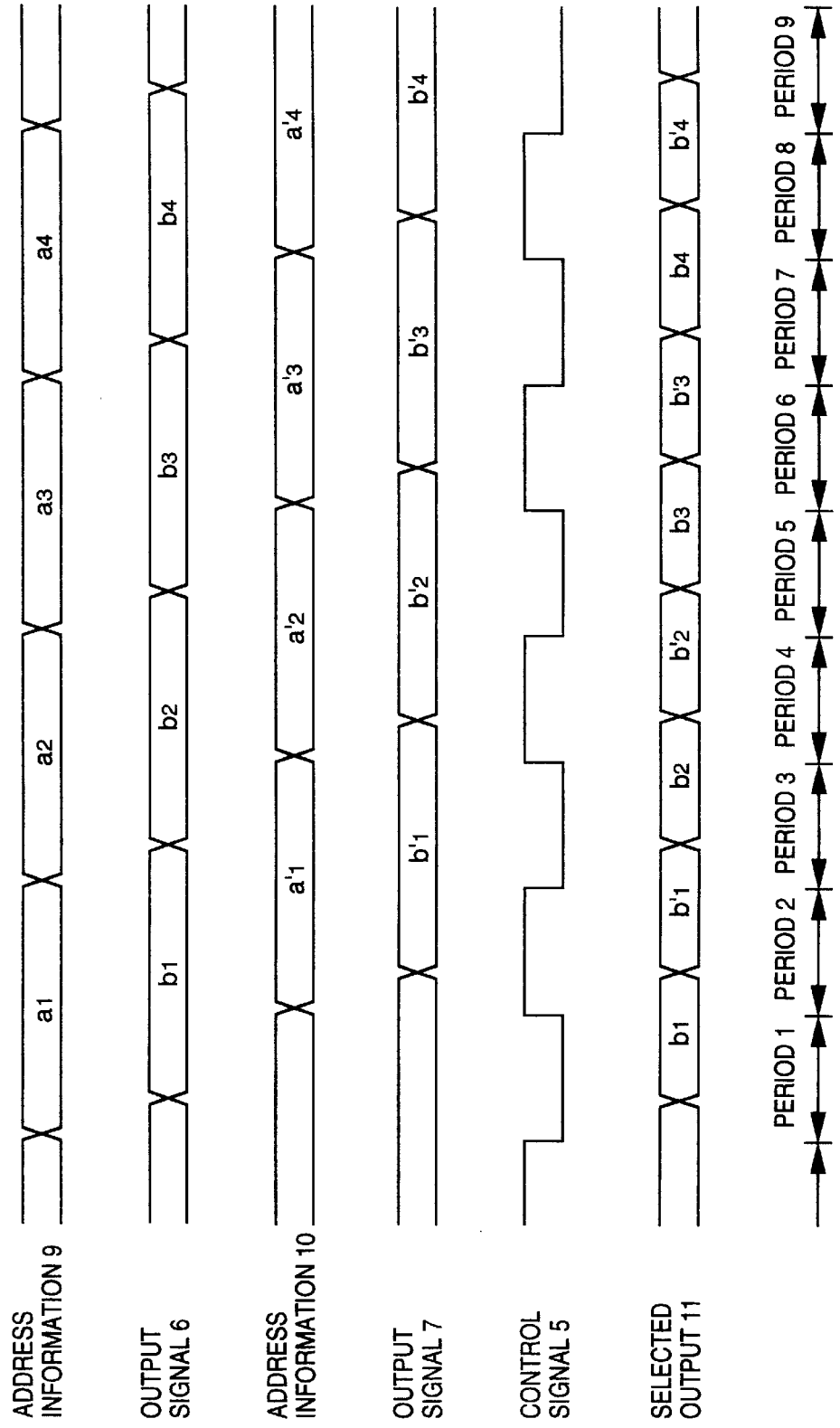
FIG. 2 is a timing chart of coding performed by the coding apparatus of the first embodiment.
Figure 3:
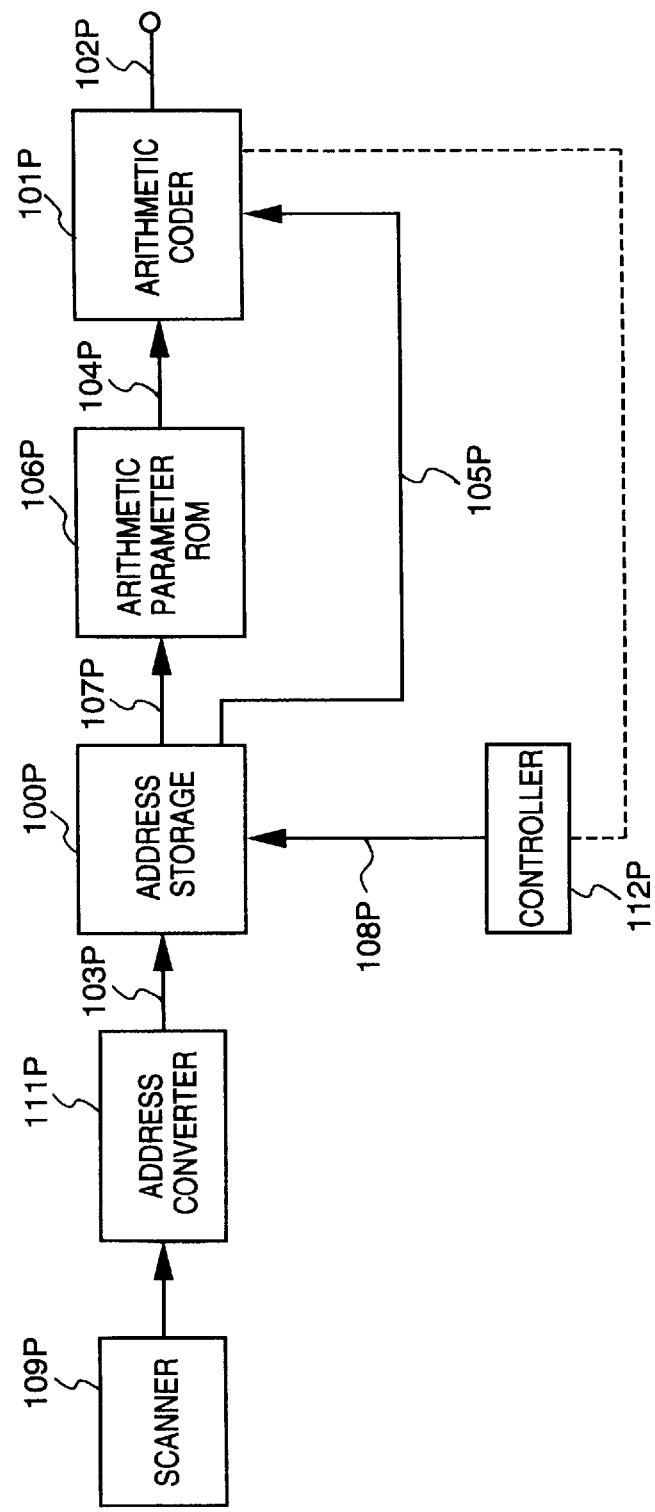
FIG. 3 is a block diagram showing an example of the configuration of a conventional coding apparatus for performing arithmetic coding.

FIG. 2 shows a timing chart of the coding apparatus of this embodiment. In FIG. 2, each of periods 1 to 9 indicates one period of a pixel clock (not shown), and the selector 4 selects the signal 6 when the control signal 5 is at level L (Low) and selects the signal 7 when the control signal 5 is at level H (High).

When the address information 9 (corresponding to the phase 0) is input as "a1" to the address storage A1 in the period 1 shown in FIG. 2, the signal 6 consisting of an estimation symbol and occurrence probability information is output as "b1".

The selector 4 selects the signal 6 in accordance with the control signal 5 and accordingly outputs the signal 11 as "b1". On the basis of the input signal 11, the arithmetic coder 3 performs arithmetic coding.

In the subsequent period 2, the address information 10 (corresponding to the phase 1) is input as "a'1" to the address storage B2, and the signal 7 consisting of an estimation symbol and occurrence probability information is output as "b'1".

The selector 4 selects the signal 7 in accordance with the control signal 5 and therefore outputs the signal 11 as "b'1". On the basis of the input signal 11, the arithmetic coder 3 performs arithmetic coding.

"a1" is held as the contents of the input address information 9 to the address storage A1 even in the period 2. Therefore, if it is necessary to update the contents (the estimation symbol and the occurrence probability information) in the address "a1" of the address storage A1, the contents can be updated by the update data 12 during the period 2. Since a new read from another address ("a2") of the address storage A1 is performed in the period 3, no timing problem arises even when exclusive control is performed to update the contents of the address storage A1 in the period 2.

The arithmetic coder 3 performs arithmetic coding on the basis of the signal 6 read out from the address storage A1 in the period 3 and consisting of an estimation symbol and occurrence probability information. If it is necessary to update the contents indicated by the address "b1" in the address storage B 2, the contents are updated by the update data 12 during the period 3.

All image data are arithmetically coded by repeating the above processing.

As described above, dividing the address storage into two parts makes adjustment of update timings feasible. Accordingly, the processing efficiency changes largely in accordance with the method of dividing the address storage. As is evident from the timing chart in FIG. 2, the highest efficiency is attained when the address storages A1 and B2 are alternately referred to. However, it is only necessary to use an optimum dividing method in accordance with the characteristics of a processing system.

Although control for the signals applied to the arithmetic coder 3 by using the selector 4 is described in this embodiment, the present invention is not limited to this embodiment. That is, the gist of the present invention is met as long as an optimum estimation symbol and optimum occurrence probability information can be applied to the arithmetic coder 3.

As described above, the address storage for storing data for specifying an estimation symbol, an occurrence probability, and the like information is divided into groups to be periodically referred to. Consequently, update data can be written in one group while the other group is being read. This allows high-speed processing.

In the first embodiment described above, the address storage is divided with respect to two phases. However, it is of course possible to divide the address storage with respect to three or more phases. Also, in the first embodiment the address storage is divided in accordance with phase. If the address information input to the address storage has periodicity, however, the address storage can be divided in accordance with the periodicity rather than phase. Consequently, the same effects as in the first embodiment can be obtained.

<First Modification>

Figure 5:
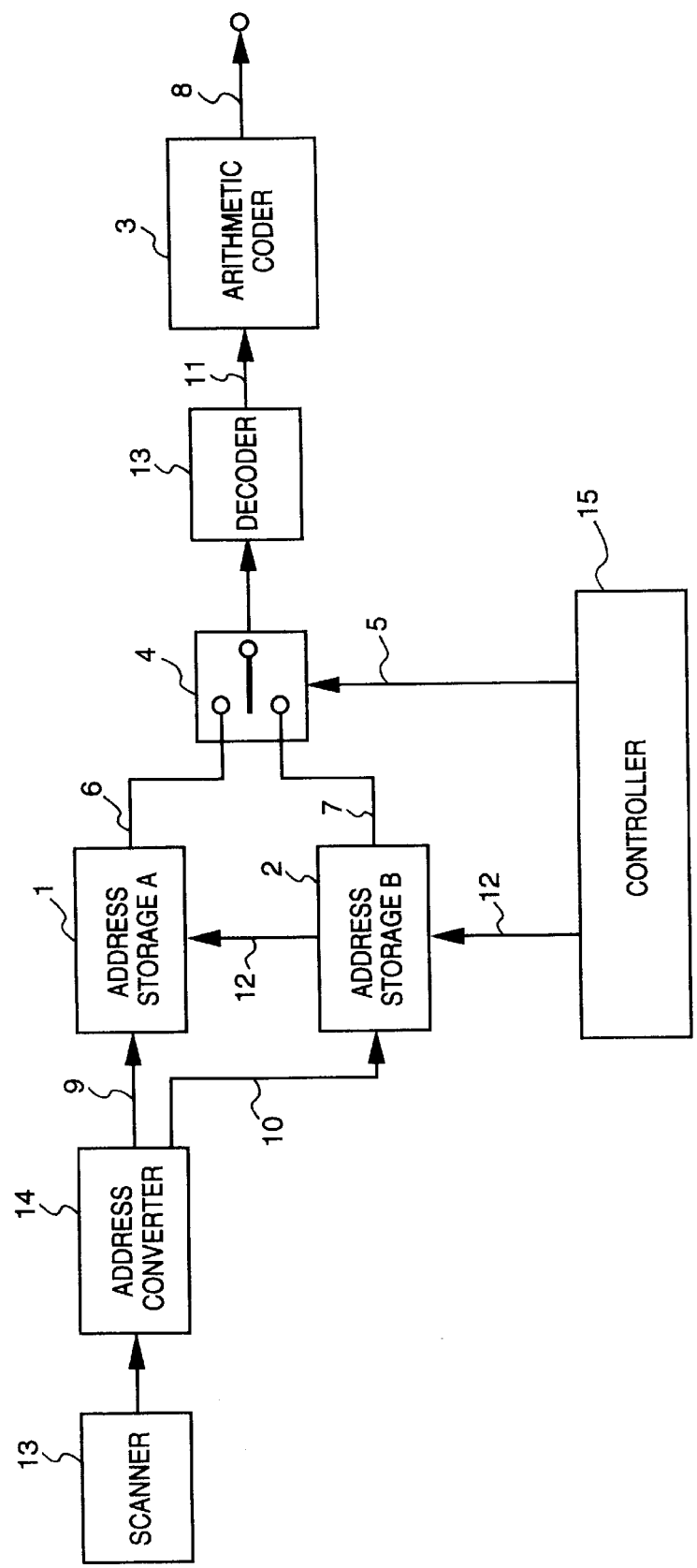
FIG. 5 is a block diagram showing another example of the configuration of the coding apparatus of the first embodiment.

In the first embodiment described above, each address storage stores an estimation symbol and occurrence probability information. However, as illustrated in FIG. 5, if the apparatus includes a decoder 13 between the selector 4 and the arithmetic coder 3, compressed or encoded data can be used as the estimation symbols and the occurrence probability information stored in the address storages A1 and B2. This makes it possible to reduce the capacities of the address storages. The decoder 13 can also be inserted, of course, between the address storage A1 and the selector 4 or between the address storage B2 and the selector 4.

In the above first embodiment, even when the input address information has no periodicity, the apparatus is desirably so constructed that coding is possible only with one address storage.

The apparatus also can be constructed so that the same address information is input to a plurality of address storages and the contents of these address storages are updated at the same timing.

<Second Modification>

In the second modification, an address storage is divided with respect to three or more phases.

Figure 6A:
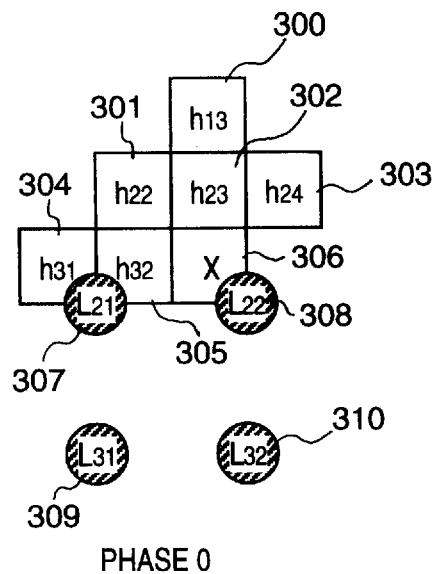
FIGS. 6A to 6D are views each showing a phase corresponding to a pixel arrangement according to the second modification of the first embodiment.
Figure 6B:
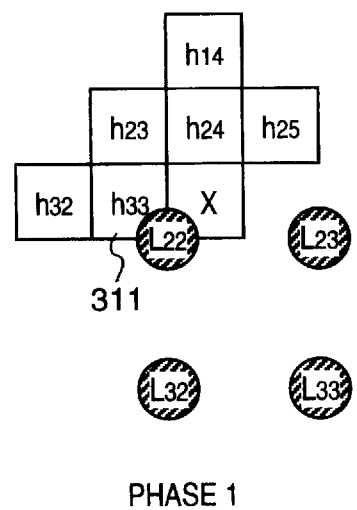
Figure 6C:
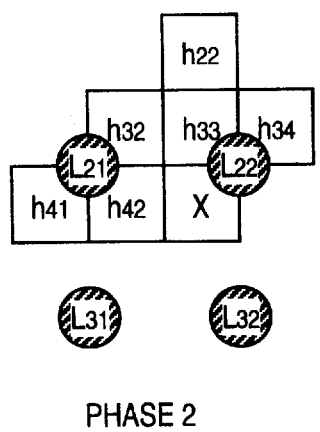
Figure 6D:
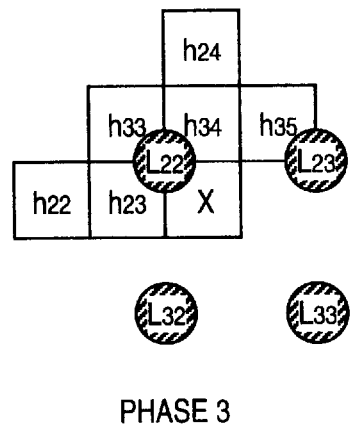

FIGS. 6A to 6D are views showing phases corresponding to pixel arrangements according to this modification. In FIG. 6A, reference numeral 306 denotes a target pixel (X) to be coded and decoded; and 300 to 305 and 307 to 310, reference pixels (template) used to predict the pixel 306.

In hierarchical coding and decoding, different phases have different templates as illustrated in FIGS. 6A to 6D in accordance with the relative positional relationship between high-resolution pixels and low-resolution pixels.

FIG. 7 is a block diagram showing the configuration of a coding apparatus according to this modification.

The addresses of prediction state storage devices 100a to 103a of FIG. 7, are constituted by templates. For example, when templates with the arrangements as in FIGS. 6A to 6D are used, 10-bit (1024) states can be predicted for each phase.

This phase is determined by the relative positional relationship between high- and low-resolution pixels. Therefore, when the occurrence probability and the symbol of the pixel 306 are predicted, coded, and decoded in the phase 0, the next pixel is coded and decoded by using data predicted by a template in phase 1. As an example, if the pixel 306 in the phase 0 is a pixel to be currently coded and decoded, in the subsequent processing a template is so constructed that the pixel 306 is the position of a pixel 311 (h33) in the phase 1.

Accordingly, when a given line is coded and decoded, prediction states are used in the order of phase 0, phase 1, phase 0, phase 1, phase 0 . . .

The coding apparatus shown in FIG. 7 can perform coding at a high rate by using this characteristic. In FIG. 7, reference character 100a denotes a storage device for storing a prediction state in phase 0; and 200a, an address of the storage device 100a constituted by a template in phase 0. Similarly, storage devices 101a, 102a, and 103a and addresses 201a, 202a, and 203a correspond to phases 1, 2, and 3, respectively.

The operation of the apparatus illustrated in FIG. 7 will be described below with reference to FIG. 7 and a timing chart in FIG. 8.

At the beginning of period 1 in FIG. 8, the address 200a is determined by the template in the phase 0. Assume that the value is PH0__a1. In accordance with this address 200a, an output 210a is read out from the storage device 100a. Assume the value is PH0__o1.

A select signal 2041a is determined by the phase state when each pixel is processed. In period 2, a selector 104a outputs PH0__o1, as outputs 205a and 214a, in accordance with the select signal 204a.

The prediction state read out as the output 205a is converted into an estimation probability (LSZ01) of an output 206a. An arithmetic coder 106a performs coding on the basis of the outputs 206a and 214a and a pixel input 230a and appropriately outputs a code 207a.

In decoding, the arithmetic coder 106a performs decoding on the basis of the outputs 206a and 214a and the code 207a and outputs a decoded pixel 231a.

If the prediction state value needs to be updated during the course of the above processing, the arithmetic coder 106a outputs UPDATE 208a as an update request signal, and update data is generated from the outputs 205a and 214a. This update data and a control output 209a are output together with a control signal for rewriting the storage device 100a. This rewrite is performed in the address PH0__a1 in the period 2.

The next pixel is coded by using a state predicted by the template in the phase 1. At the beginning of period 2, PH1__a1 as the address 201a is input to the storage device 101a, and PH1__o1 is read out as an output 211a. This output 211a is selected by the select signal 204a and delivered as the outputs 205a and 214a in period 3.

These outputs are converted into LSZ11 by the decoder 105a. On the basis of the outputs 206a and 214a, coding in period 3 is performed. Update processing, if necessary, is performed in the same fashion as above, and the update data is written in the storage device 101a.

<Second Embodiment>

In the second embodiment, a case where two phases exist in accordance with pixel arrangements will be described for the sake of simplicity of explanation. In the individual phases, reference pixels (templates) are generated as follows. That is, a target pixel 306 in the phase 0 shown in FIG. 6A according to the second modification of the first embodiment is a pixel to be coded and decoded, and a prediction value is determined by pixels except for this pixel 306. Coding and decoding are performed on the basis of this prediction value.

When the coding and decoding are completed, coding and decoding for the next pixel are performed. A pixel 311 (h33) required to generate a template in the phase 1 is the pixel 306 which is the pixel to be coded and decoded in the phase 0.

In this way templates are successively generated to perform coding and decoding.

Figure 9:
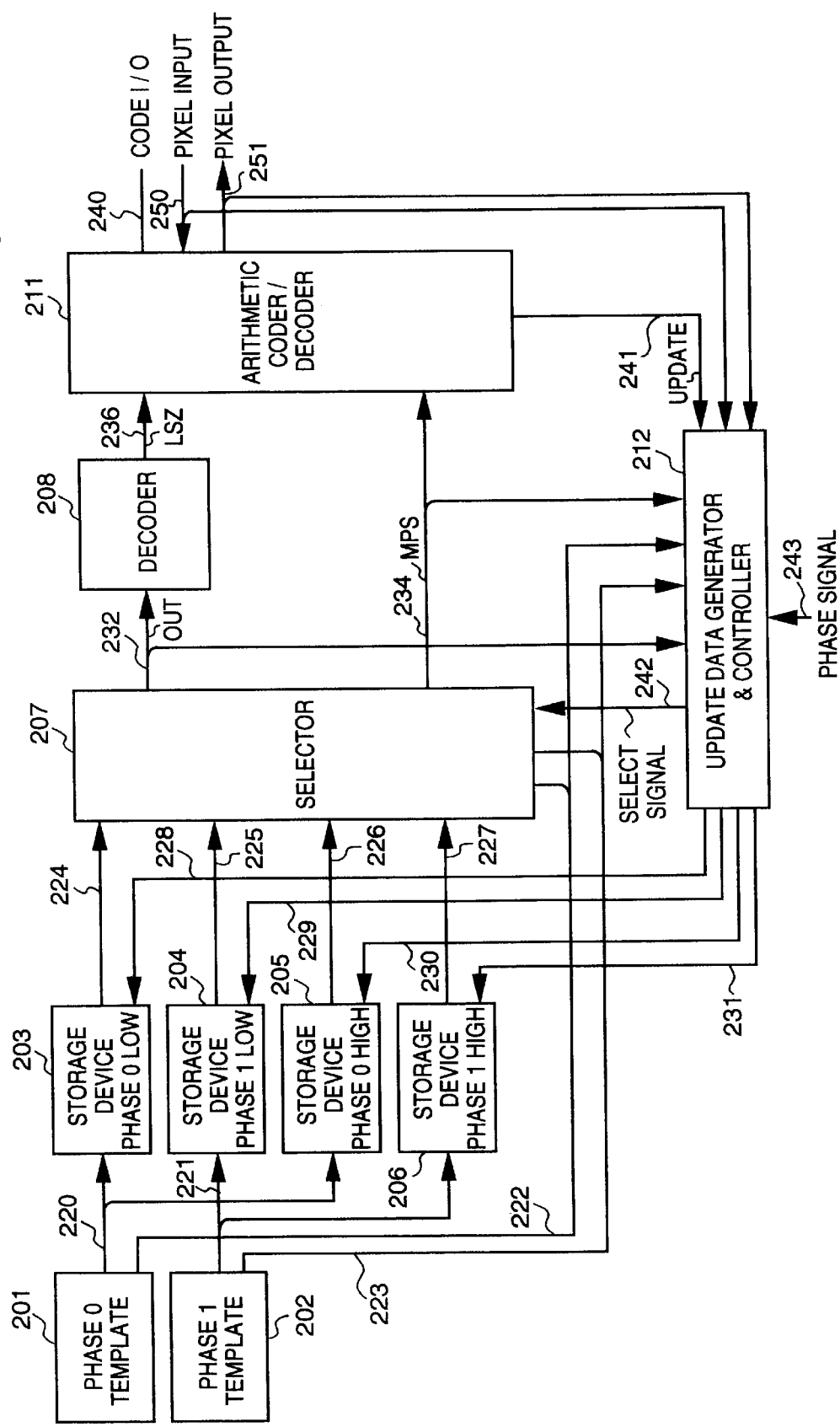
FIG. 9 is a block diagram showing the configuration of a coding/decoding apparatus according to the second embodiment of the present invention.

FIG. 9 is a block diagram showing the configuration of a coding/decoding apparatus according to the second embodiment of the present invention. In FIG. 9, reference numerals 201 and 202 denote template generators for generating reference pixels (templates) in the phases 0 and 1, respectively; 220 and 221, pixels excluding those containing a preceding pixel to be coded or decoded; and 222 and 223, the excluded pixels.

For example, assuming the excluded pixels are limited to a preceding pixel to be coded and decoded, in the phase 0, the pixel 222 corresponds to a pixel 305 of FIG. 6A, and the numeral 220, the remaining pixels. In the phase 1, the excluded pixel corresponds to a pixel 311 of FIG. 6B. If phase0≧phase 1, the pixel 306 in the phase 0 is the same as the pixel 311 in the phase 1.

The operation of decoding performed by the apparatus of this embodiment will be described below with reference to a timing chart of FIG. 10.

Storage devices 203 and 205 in FIG. 9 store prediction state values in the phase 0. These storage devices 203 and 205 are obtained by dividing the storage device 100 of FIG. 7, into two parts. When templates as shown in FIGS. 6A to 6D are used, each storage device can store 512 different prediction states.

Analogously, storage devices 204 and 206 correspond to the storage device 101 of FIG. 7.

Figure 10:
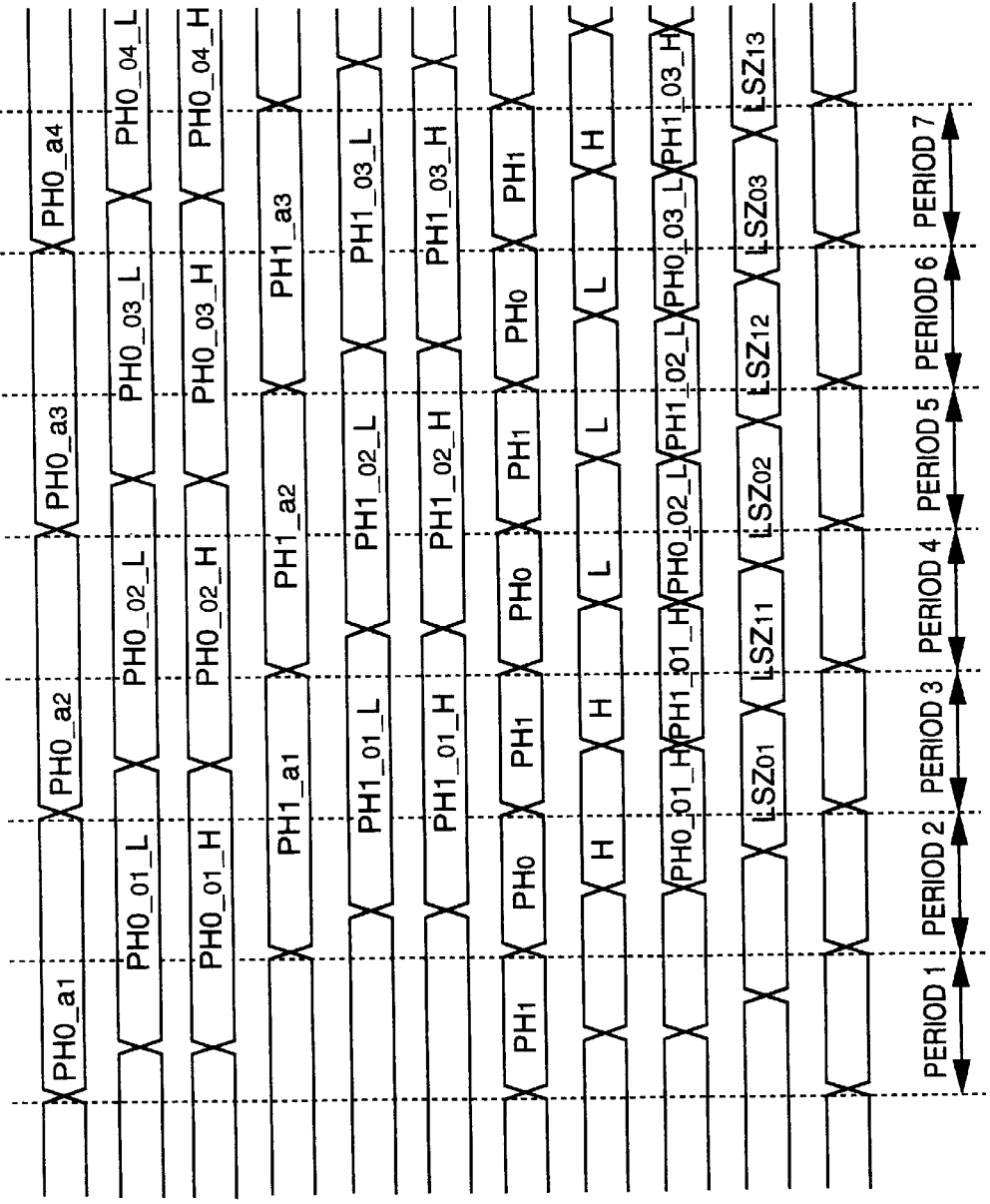
FIG. 10 is a timing chart showing the operation of the apparatus according to the second embodiment.

At the beginning of the period 2 in the timing chart of FIG. 10, the storage devices 204 and 206 in the phase 1 are read. The addresses of these storage devices 204 and 206 are constituted by pixels except for the pixel 311. Assume the value is PH1__a1. In response to this address input, the storage devices 204 and 206 deliver outputs 225 and 227. Assume that the values of these outputs 225 and 227 are PH1__o1__L and PH1__o1__H, respectively (see FIG. 10).

An input phase signal 243 to an update data generator & controller 212 shows a phase by which the current target pixel is to be processed. Processing in the phase 0 is completed during the period 2. In decoding, therefore, an arithmetic coder/decoder 211 outputs a decoded pixel 251 during the period 2.

A select signal 242 is determined by the phase signal 243 and the decoded pixel 251, and a selector 207 selects one of the outputs 224 to 227 from the storage devices 203 to 206 and outputs the selected output as outputs 232 and 234.

During the period 2, the pixel 251 which is decoded by the preceding phase is determined. If this value is H, the output 232 from the selector 207 is PH0__o1__H. This output 232 is input to a decoder 208 where the output 232 is converted into an estimation probability (LSZ) 236.

In the period 3, the arithmetic coder/decoder 211 performs decoding on the basis of the estimation probability 236 and the output 234 and outputs the pixel output 251. During the period 3, this output 251 is used to select PH0__o2__L or PH0__o2__H already read out. In the same fashion as above, the processing is repeatedly performed.

If the arithmetic coder/decoder 211 outputs a signal 241 as a prediction state value update request, the update data generator & controller 212 generates and controls update data on the basis of the signal 241, together with the outputs 232 and 234 from the selector 207 and the phase signal 243.

Note that the storage devices 203 to 206 are appropriately updated in accordance with outputs 228 to 231 from the update data generator & controller 212.

As described above, this apparatus includes a mechanism which forms a template by excluding the immediately preceding decoded pixel, divides a prediction state in each phase into two parts, applies the same template output to divided storage devices and independently reads these storage devices, and, in accordance with these outputs, the apparatus independently determines, e.g., estimation probabilities and prediction symbols from the respective prediction states. Also, by using the value of the preceding decoded pixel, the apparatus can select an estimation probability, an estimation symbol, and the like necessary to decode the pixel currently being decoded and can perform a rewrite to in a storage device. Consequently, the arithmetic coder/decoder can be operated at a high speed independently of update processing for a storage device which stores data compression ratios and prediction state values.

<Third Embodiment>

The third embodiment according to the present invention will be described below.

Figure 11:
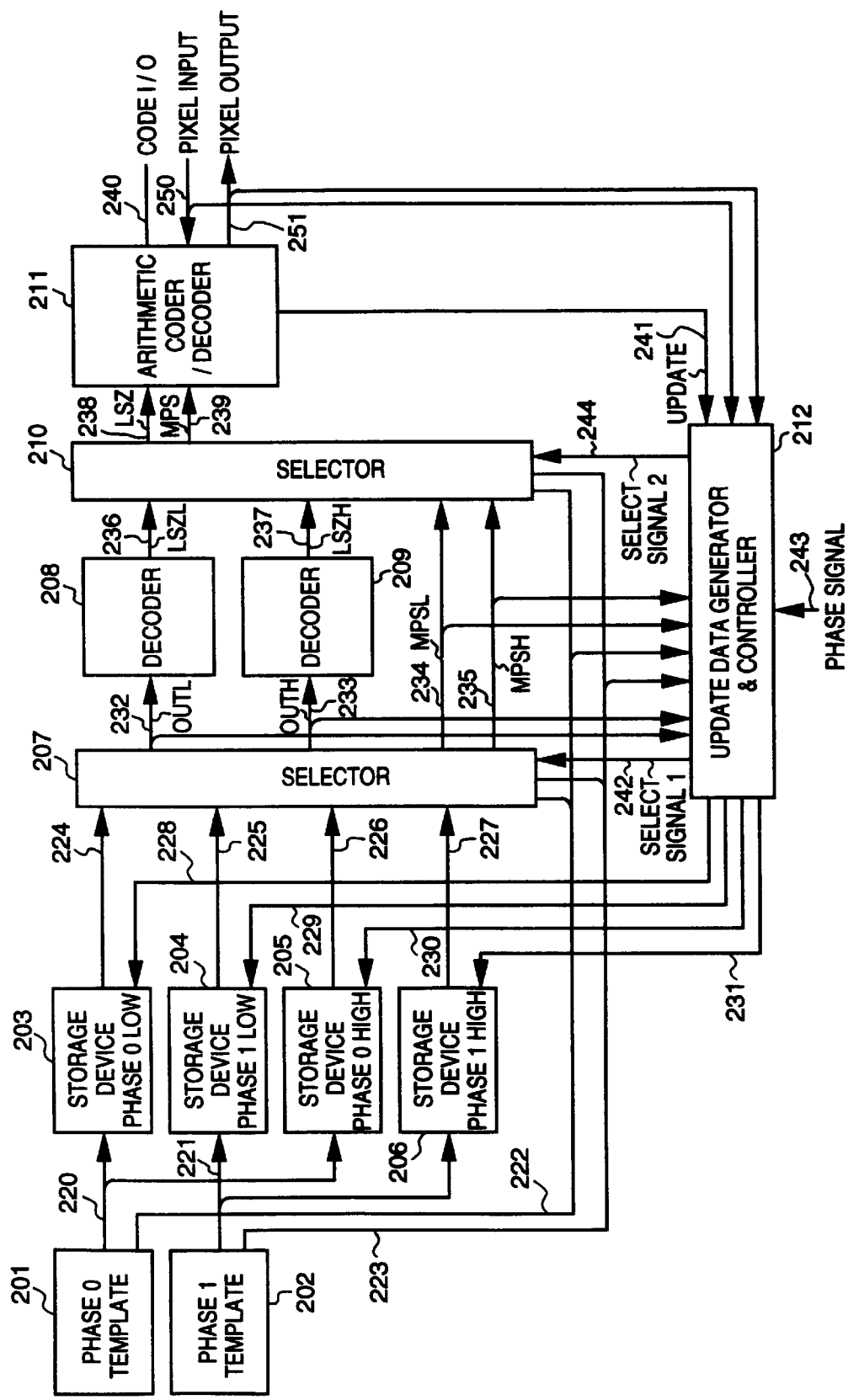
FIG. 11 is a block diagram showing the configuration of a coding/decoding apparatus according to the third embodiment of the present invention.

FIG. 11 is a block diagram showing the configuration of a coding/decoding apparatus according to the third embodiment. The same reference numerals as in the apparatus according to the second embodiment shown in FIG. 9, denote the same parts in FIG. 11.

The operation of decoding in this embodiment will be described below with reference to FIG. 11 and a timing chart shown of FIG. 12.

Figure 12:
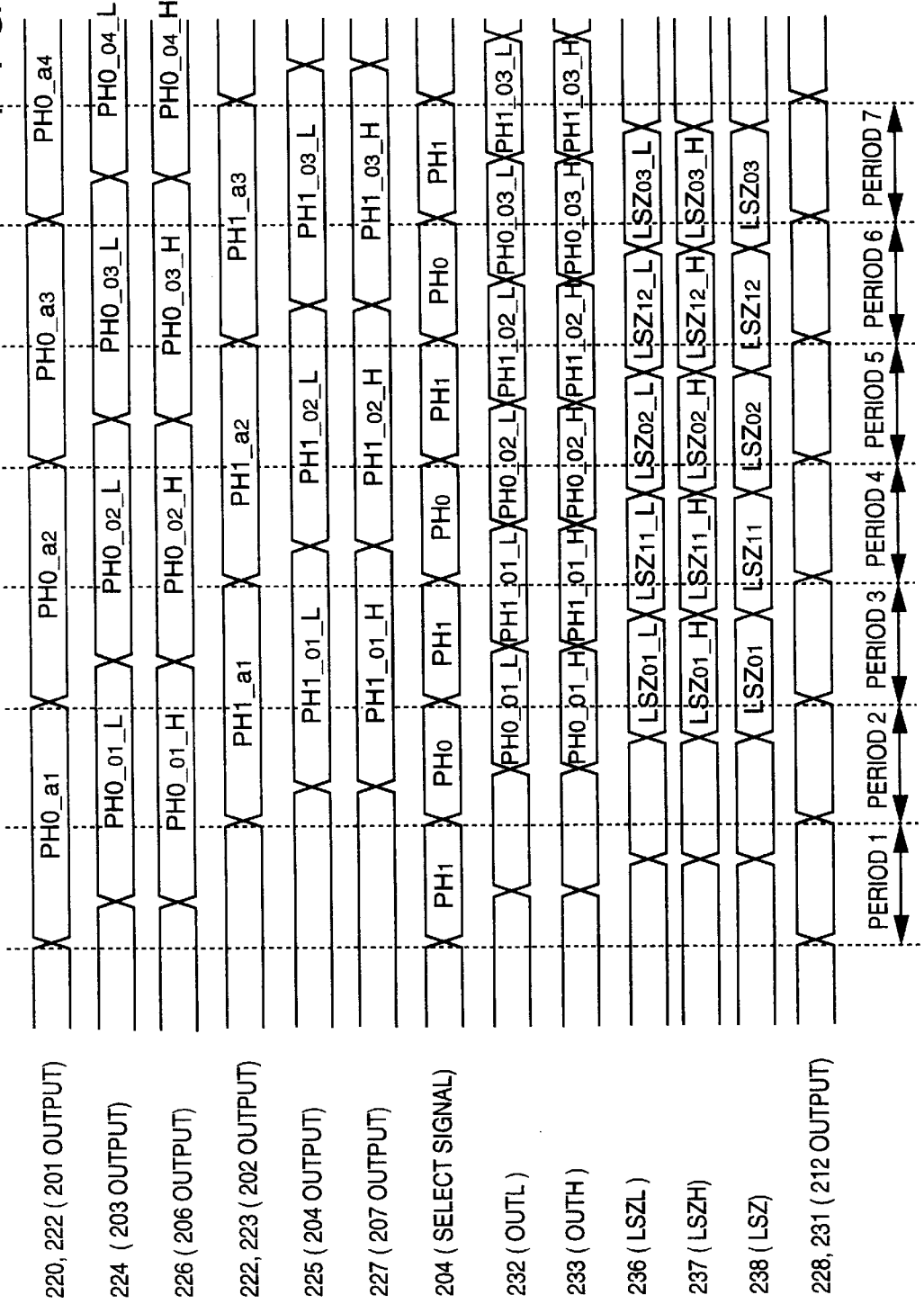
FIG. 12 is a timing chart showing the operation of the apparatus according to the third embodiment.

As in the second embodiment, at the beginning of period 2 in FIG. 12 a read operation to storage devices 204 and 206 in phase 1 is performed. The addresses of these storage devices 204 and 206 are constituted by pixels excluding the pixel 311 in FIG. 6B. Assume that the value is PH1_a1. In response to this address input, the storage devices 204 and 206 deliver outputs 225 and 227, respectively. Assume the values of these outputs 225 and 227 are PH1_o1_L and PH1_$_{tp}$1_H, respectively.

A phase signal 243 shows a phase in which the current target pixel is to be processed. Processing in phase 0 is completed during the period 2. In decoding, therefore, an arithmetic coder/decoder 211 outputs a decoded pixel 251 during this period 2.

Select signal 1 (242) is determined by the phase signal 243, and a selector 207 selects phase outputs 232, 233, 234, and 235 from the outputs 224 to 227 from the storage devices 203 to 206. These phase outputs 232 and 233 are converted into estimation probabilities 238 and 239 by decoders 208 and 209, respectively.

During the period 2, the pixel 251 which is decoded by the preceding phase is determined. If this value is logic High, LSZH and MPSH are delivered as an output (LSZ) 238 and an output (MPS) 239, respectively, from a selector 210 by select signal 2 (244).

In period 3, the arithmetic coder/decoder 211 performs decoding on the basis of the outputs 238 and 239 and outputs the pixel output 251. During the period 3, this output 251 is used to select LSZ11_L or LSZ11_H already read out. In the same fashion as above, the processing is repeatedly performed.

If the arithmetic coder/decoder 211 issues an output 241 as a prediction state value update request, an update data generator & controller 212 generates and controls update data on the basis of the output 241 together with the outputs 232, 233, 234, and 235 from the selector 207 and the phase signal 243. Note that the storage devices 203 to 206 are appropriately updated in accordance with outputs 228 to 231 from the update data generator & controller 212.

<Modification>

Figure 13:
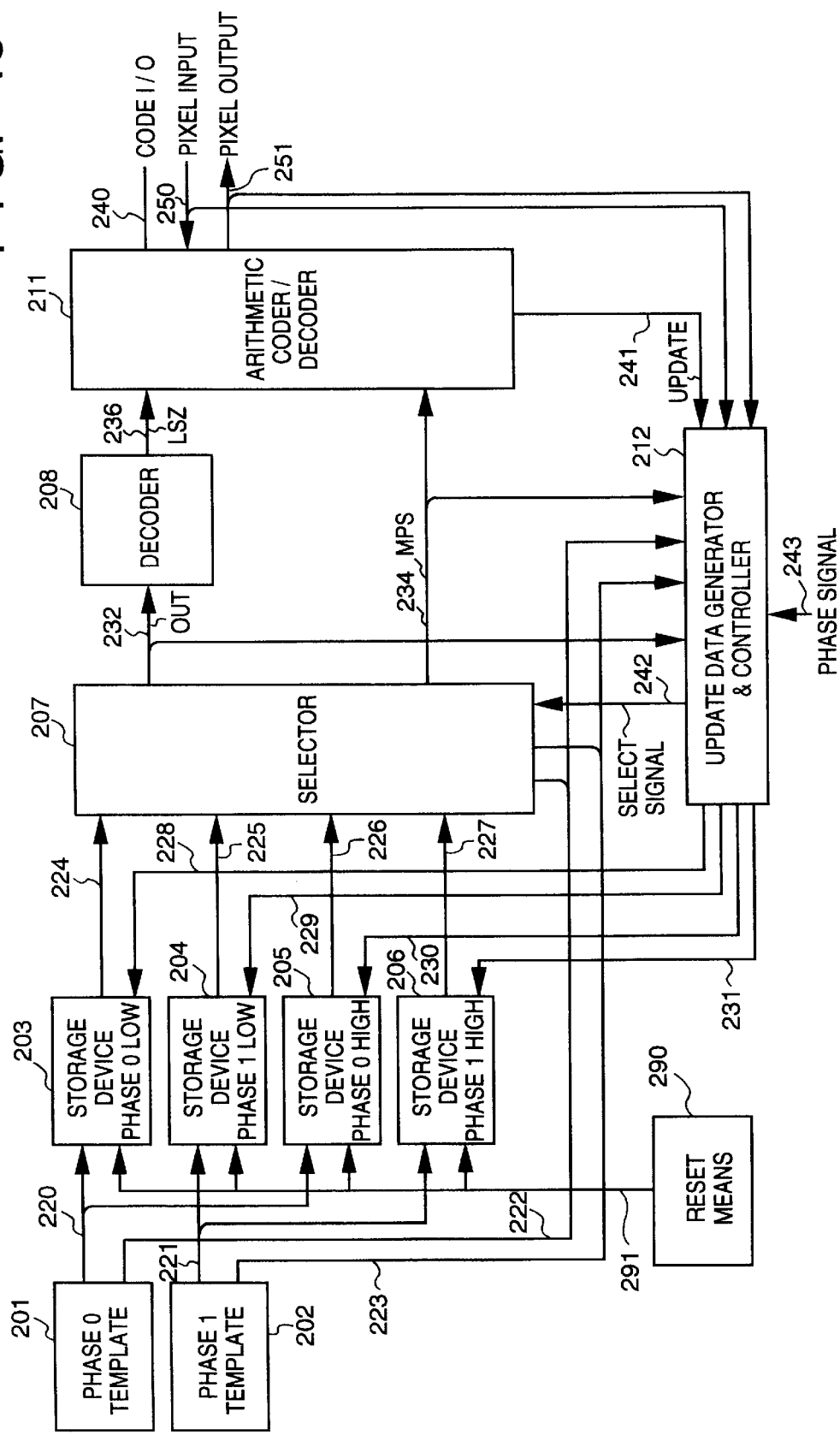
FIG. 13 is a block diagram showing the configuration of a coding/decoding apparatus according to a modification of the second and third embodiments.

FIG. 13 is a block diagram showing the configuration of a coding/decoding apparatus according to a modification of the second and third embodiments described above. In FIG. 13, the same reference numerals as in the apparatuses according to the second and third embodiments shown in FIGS. 9 and 11, denote the same parts.

In this modification, a reset means 290 is provided to reset the storage devices 203 to 206 corresponding to two phases prior to coding or decoding. That is, the storage devices 203 to 206 are simultaneously reset by an output 291 from the reset means 290.

Consequently, the storage devices can be reset within shorter periods of time.

In the above description, detailed timings and the like are omitted to simplify the explanation. However, the characteristic feature of the present invention is that a template is constituted by excluding pixels whose values are unknown, a plurality of candidates of prediction state values are previously read out, and a prediction state value is determined at the time the value of a pixel becomes known.

<Fourth Embodiment>

Figure 14:
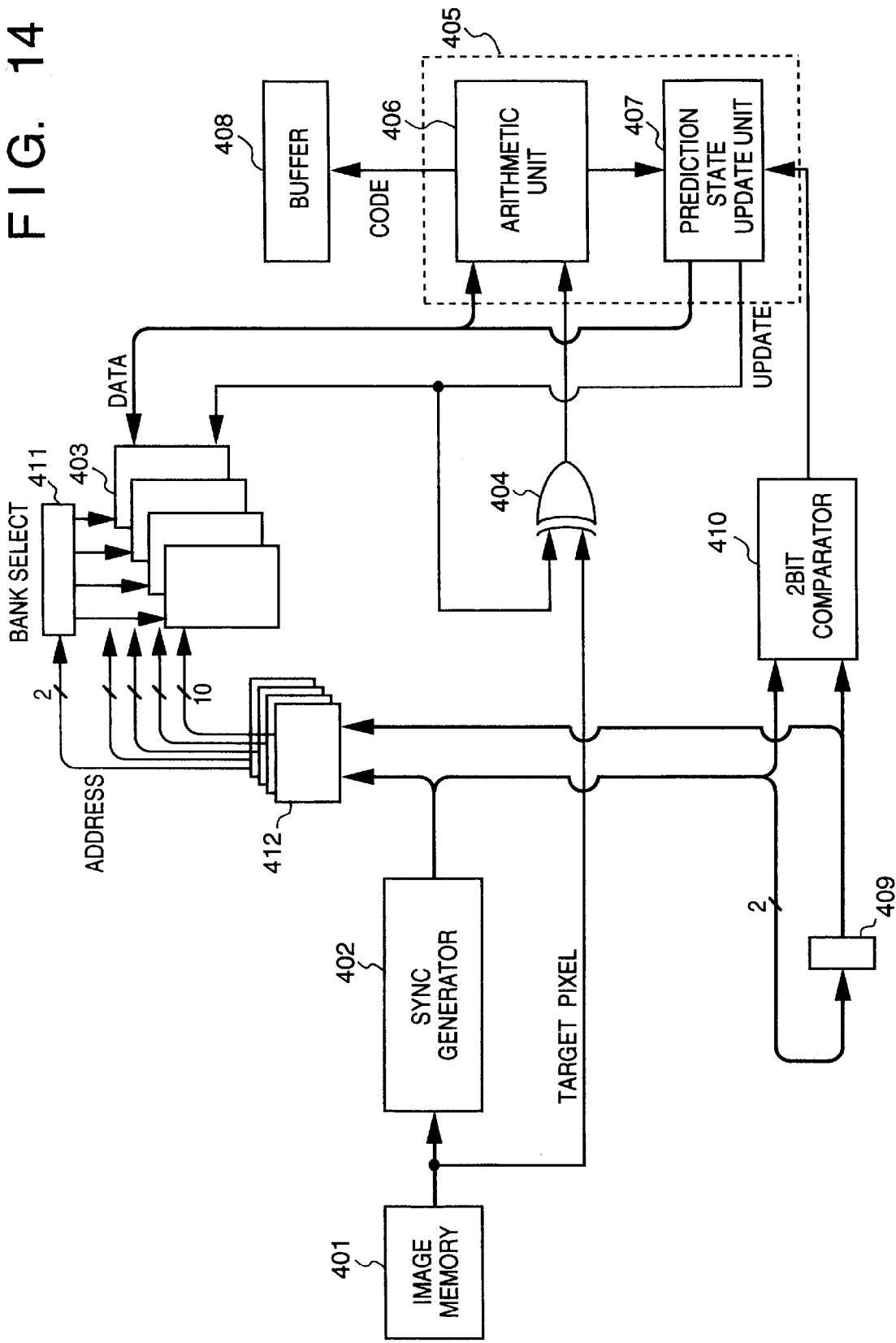
FIG. 14 is a block diagram showing the configuration of a coding apparatus according to the fourth embodiment.

FIG. 14 is a block diagram showing the configuration of a coding apparatus according to the fourth embodiment of the present invention.

Referring to FIG. 14, an image memory 401 stores an image to be coded. A prediction-reference-pixel sync generator 402 supplies prediction reference pixels to a prediction state memory (to be described below). The prediction-reference-pixel sync generator 402 consists of a line memory of several lines, a latch for performing a delay of a few pixels, and the like components.

A prediction state memory 403 receives a prediction reference pixel as an address input and outputs a prediction symbol and a prediction state. In this embodiment the prediction state memory 403 is divided into four banks. An exclusive OR (EOR) gate 404 determines the agreement/disagreement of a target pixel to be coded and the prediction symbol. A coding circuit 405 receives the prediction state from the prediction state memory 403 and the agreement/disagreement from the exclusive OR gate 404 and performs coding. The coding circuit 405 includes an arithmetic unit 406 and an update logic (prediction state update unit) 407. A buffer memory 408 stores the output code from the coding circuit 405.

A 2-bit data latch 409 delays given two bits of a template shown in FIG. 18, by one pixel. FIG. 18 shows an example of prediction reference pixels (template). In FIG. 18, reference symbol * denotes a pixel to be coded (target pixel), and hatched squares 1 to 12 represent prediction reference pixels. In this embodiment, a template is constituted by using twelve pixels in four lines including the self-line. The arrangement shown in FIG. 18 is merely an example, and the number and positions of reference pixels will not be mentioned in this embodiment. A comparator 410 compares two bits of a template (409 output) currently being used with two bits of a template (409 input) for the next target pixel. The output from the comparator 410 is applied to the prediction state update unit (update logic) 407. Reference numeral 411 denotes a 2-to-4 decoder for decoding two bits; and 412, a multiplexer for switching the addresses of the prediction state memory 403 before and after latch.

Figure 15:
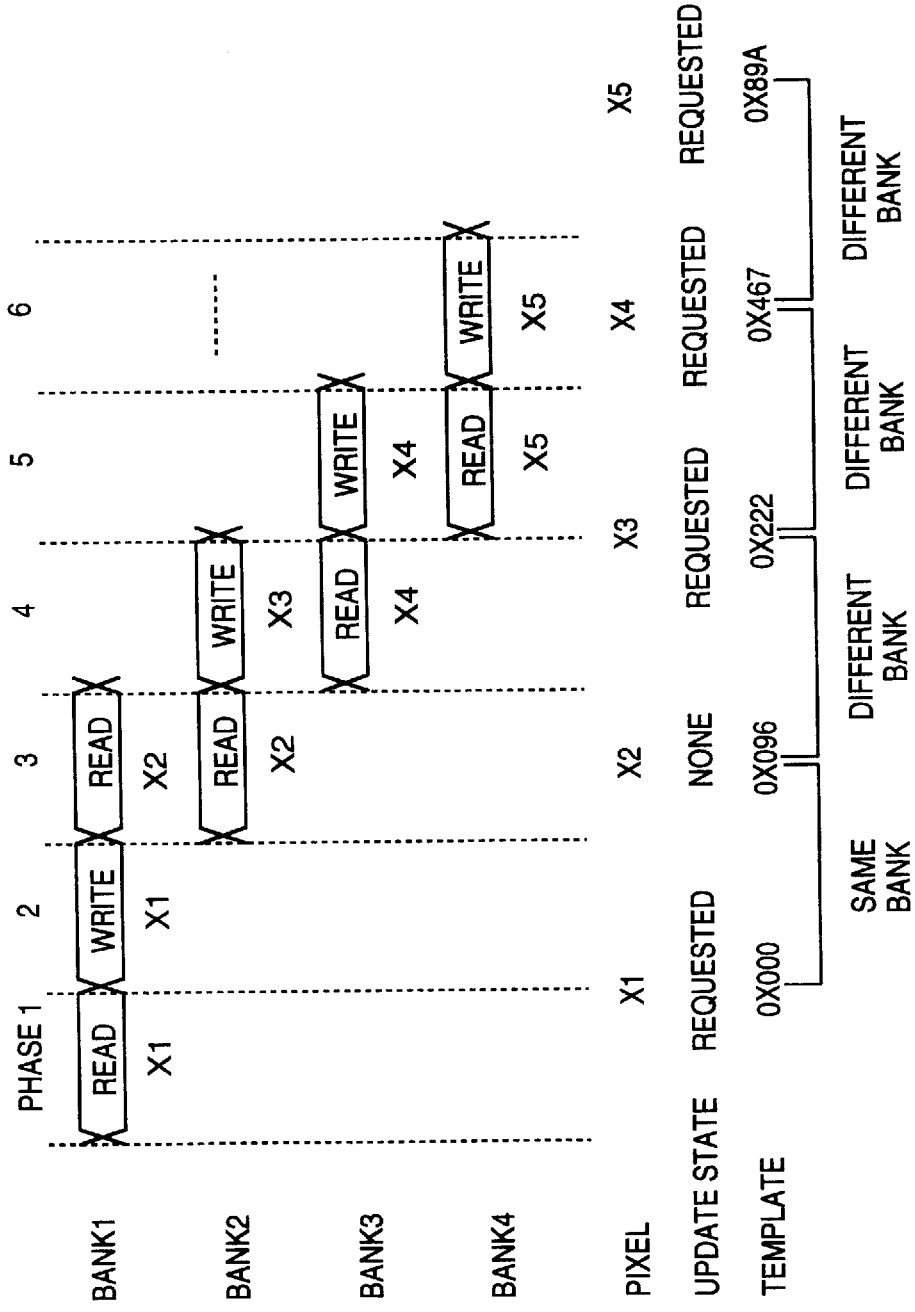
FIG. 15 is a view showing the access timings of a prediction state memory shown in FIG. 14.

FIG. 15 shows memory access timings when outputs from the comparator 410 indicate agreement/disagreement. If the output from the comparator indicates agreement (banks of the prediction state memory 403 corresponding to two consecutive target pixels are the same), read and write actions must be performed for the same bank, and so a normal operation is performed (PHASE 1 and PHASE 2). At this time, read and write actions are sequentially performed only for one predetermined bank of the prediction state memory 403. If the output from the comparator 410 indicates disagreement, it is possible to simultaneously perform a write (prediction state update) to the prediction state memory 403 and a read (from a bank different from the updated bank) of a prediction state for the subsequent pixel (PHASE 4 and PHASE 5).

FIG. 15 illustrates the procedure of coding in which each PHASE is a minimum processing unit. Also, the pixels to be coded are five pixels X1 to X5, and the two upper bits of a template are used in identification of a bank. In the PHASE 1, normal read and write operations are performed since update is generated and the same bank (0X096:two upper bits:0→bank 1) of a template corresponds to the current pixel and the next pixel. Processing for X1 is completed in two cycles including the PHASE 2.

In PHASE 3, processing for X2 is performed. In this processing, no update processing is performed, and only a read (of a prediction state) from the bank 1 is performed. Also, since X2 corresponds to a bank different from the bank of a template (0X222:two upper bits:2→bank 2) for the next pixel X3, these two pixels can be simultaneously read out.

In PHASE 4, a write to the bank 2 and a read of the next pixel X4 from bank 3 are simultaneously performed. Similarly, in PHASE 5 it is possible to simultaneously perform a write to the bank 3 and a read from bank 4.

In the fourth embodiment as described above, read and write actions can be performed for different banks at the same timing. Accordingly, the rate of coding processing can be increased.

Although the memory is divided into four banks for convenience in the above fourth embodiment, the present invention is not limited to this embodiment. That is, the effect of the present invention is achieved when one or more banks are provided, and is further enhanced when a memory is divided into a larger number of banks.

<Modification of Fourth Embodiment>

Figure 16:
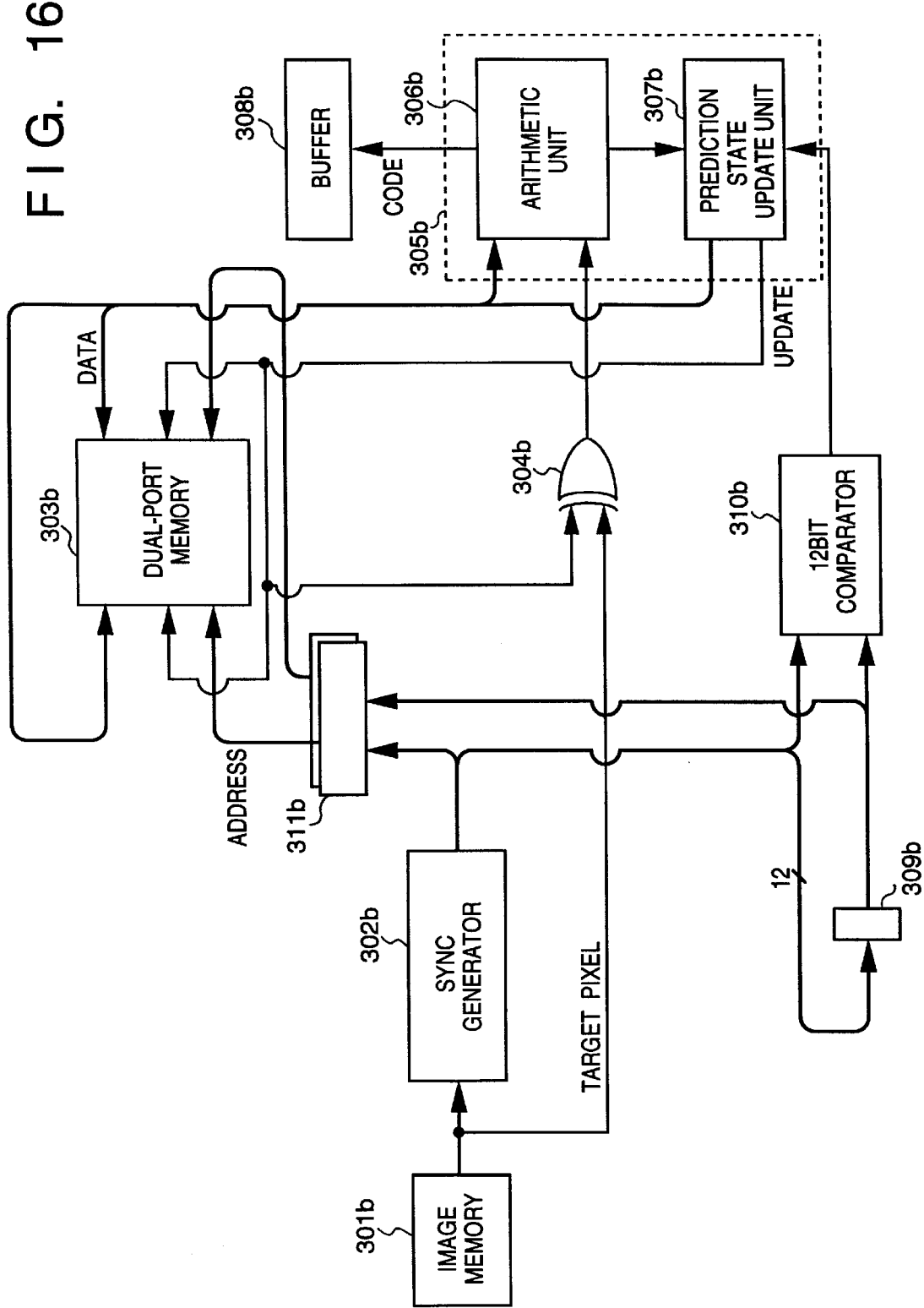
FIG. 16 is a block diagram showing a configuration according to a modification of the fourth embodiment.

FIG. 16 is a block diagram showing the configuration of a coding apparatus according to a modification of the fourth embodiment.

This modification makes use of a dual-port memory 303*b* as a prediction state memory. Reference numeral 309*b* denotes a 12-bit (full-bit) data latch; and 310*b*, a 12-bit comparator. An address selector 311*b* selects the address of the pixel currently being processed (302*b* output) or the address of the immediately preceding pixel (309*b* output) as an address of each port of the dual-port memory 303*b*. Simultaneous access is performed for the dual-port memory 303*b* unless two ports have the same address.

In this modification, therefore, the comparator 310*b* compares all bits of templates, and this makes a high-speed operation possible without dividing the prediction state memory into banks.

<Fifth Embodiment>

Figure 17:
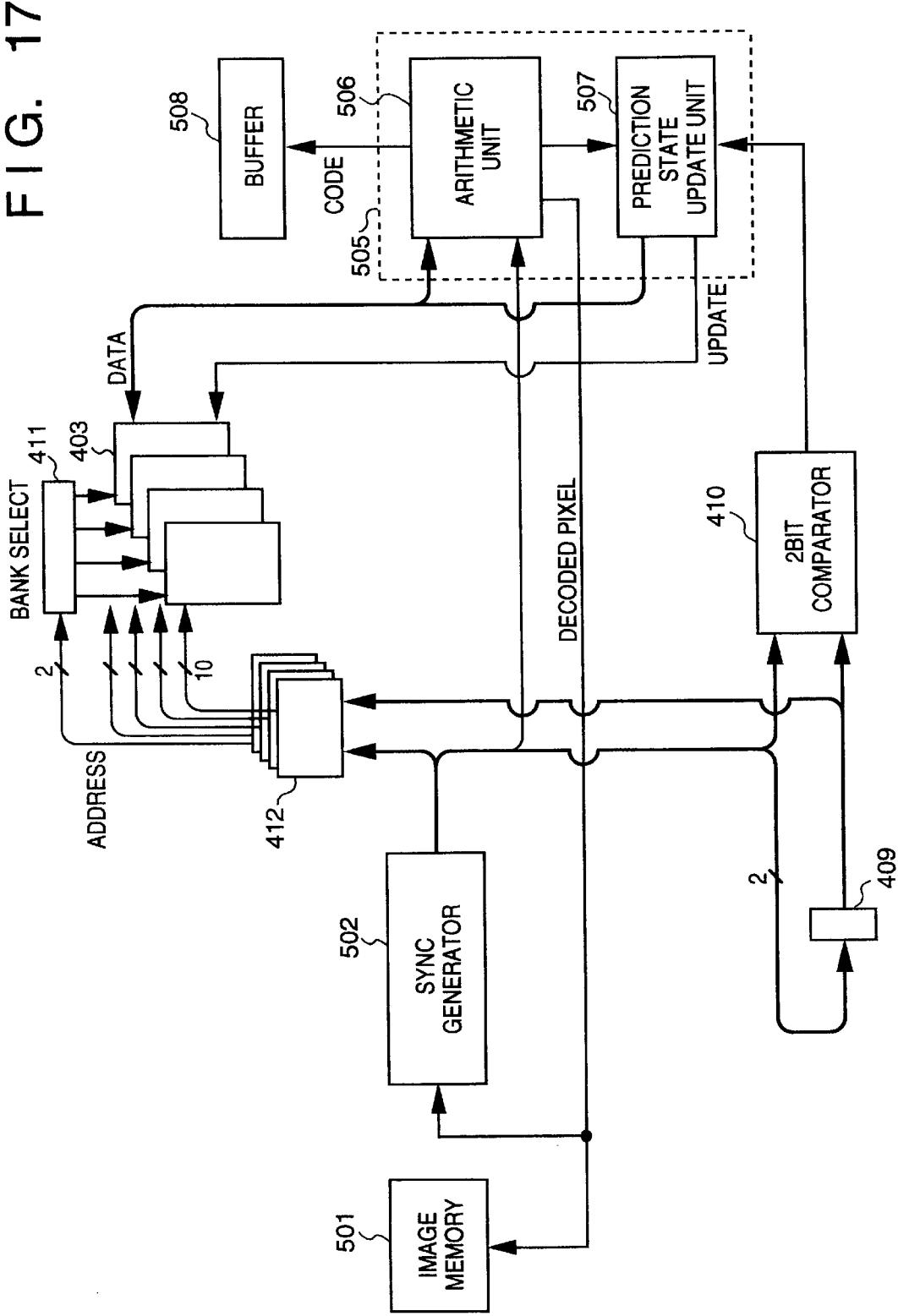
FIG. 17 is a block diagram showing the configuration of a decoding apparatus according to the fifth embodiment.

FIG. 17 is a block diagram showing the configuration of a decoding apparatus according to the fifth embodiment. Referring to FIG. 17, a decoding circuit 505 consists of an arithmetic unit 506 and an update logic 507. The decoding circuit 505 sequentially reads out codes from a code buffer and decodes the codes. Each decoded pixel is written in an image memory 501 and at the same time applied to a prediction-reference-pixel sync generator 502 and reused as a part of a template in later decoding processing. The rest of the configuration is identical with the coding apparatus shown in FIG. 14.

Figure 19:
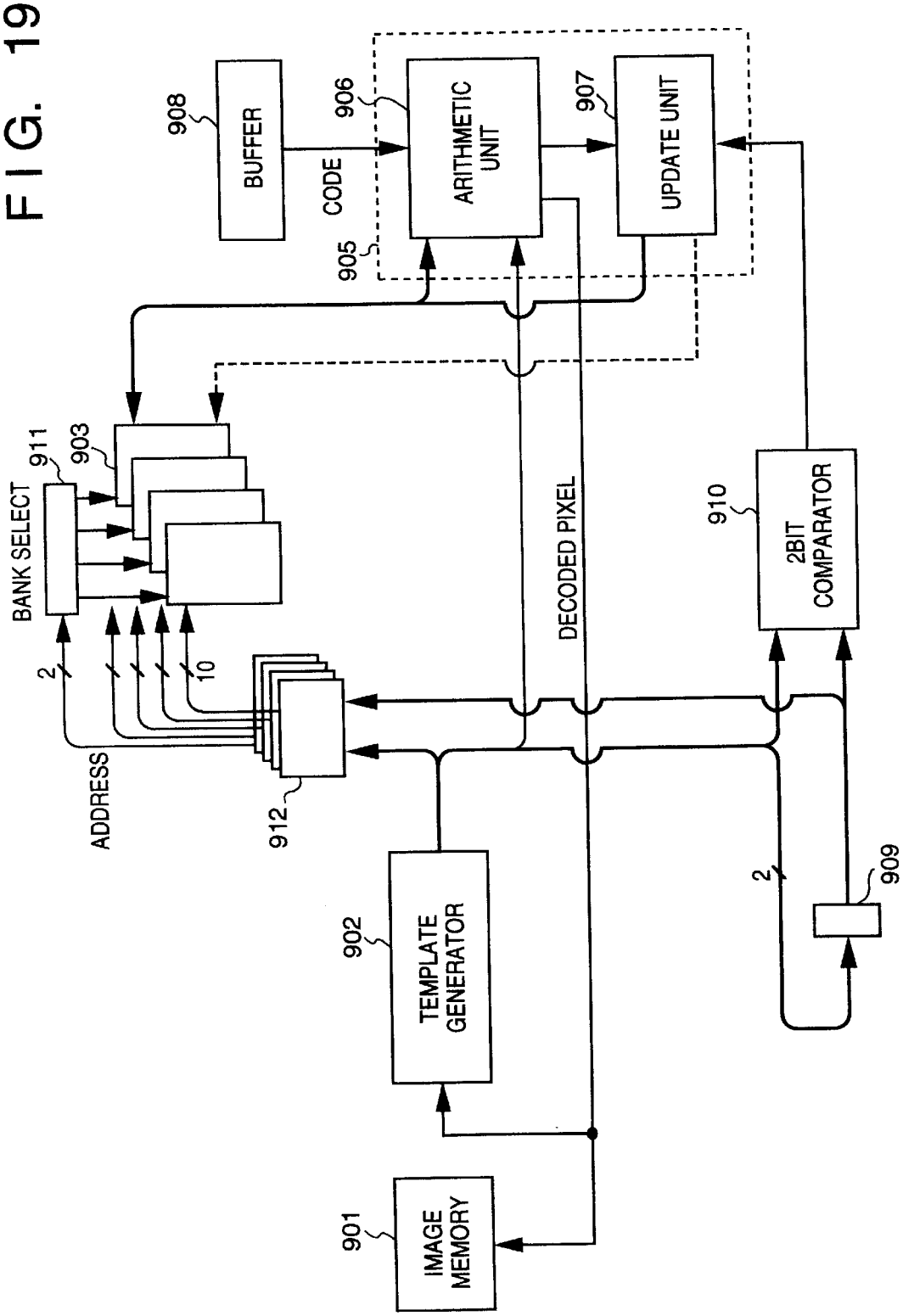
FIG. 19 is a block diagram showing an arithmetic operation during decoding.

FIG. 19 shows an arithmetic operation during decoding. In FIG. 19, reference numeral 908 denotes a code buffer memory. Decoding processing is executed on the basis of coded data read out from the code buffer memory 908, an output from a prediction state memory 903, and an output from a template generator 902, thus generating a decoded pixel. The decoded pixel is written in an image memory 901 and at the same time applied to the template generator 902 and reused in decoding processing for the subsequent pixels.

Figure 20:
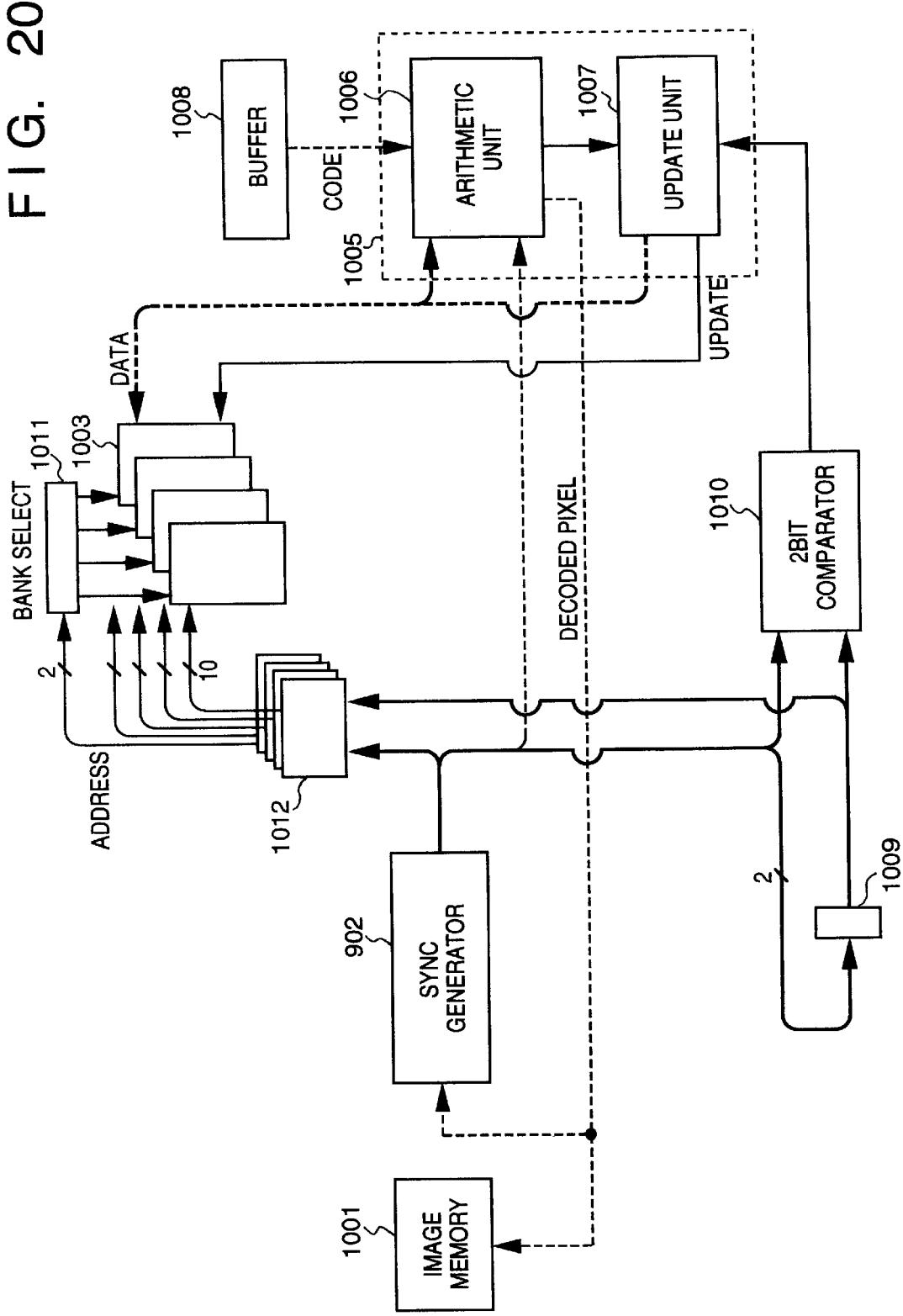
FIG. 20 is a block diagram showing an operation when update processing is performed after a pixel to be decoded is output.

FIG. 20 shows an operation when update is performed after the decoded pixel is output. When a decoder issues an update instruction, an update unit 1007 performs a write operation on a prediction state memory 1003. In this decoding processing, as illustrated in FIG. 15, if a bank for the write operation is different from a bank from which the next pixel is read out, read and write actions can be simultaneously performed.

In this manner, according to the fifth embodiment, it is possible to increase the rate of decoding processing.

<Sixth Embodiment>

The sixth embodiment of the present invention will be described in detail below with reference to the accompanying drawings.

Figure 22:
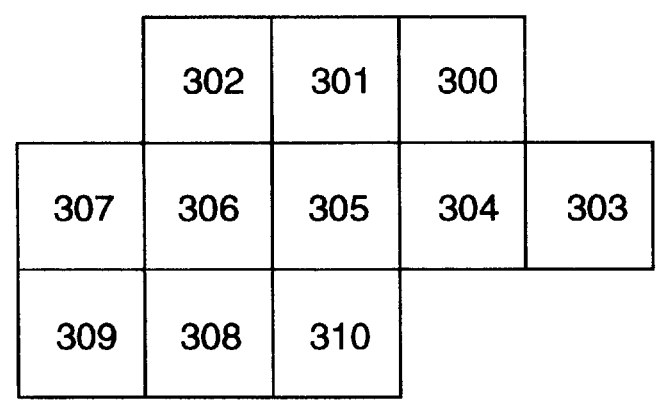

FIG. 22 shows the arrangement of reference pixels according to the sixth embodiment of the present invention. In FIG. 22, reference numeral 310 denotes a target pixel to be coded and decoded; and 300 to 309, peripheral pixels which are used to predict the target pixel 310 and already coded and decoded. As in the above embodiments, these peripheral pixels will be referred to as reference pixels (template).

This template constitutes an address of a prediction state memory (to be described later); that is, this template is an address of a storage device for determining a prediction value. As an example, if a template takes the arrangement as shown in FIG. 22, 10-bit (1024) states can be predicted.

Figure 21:
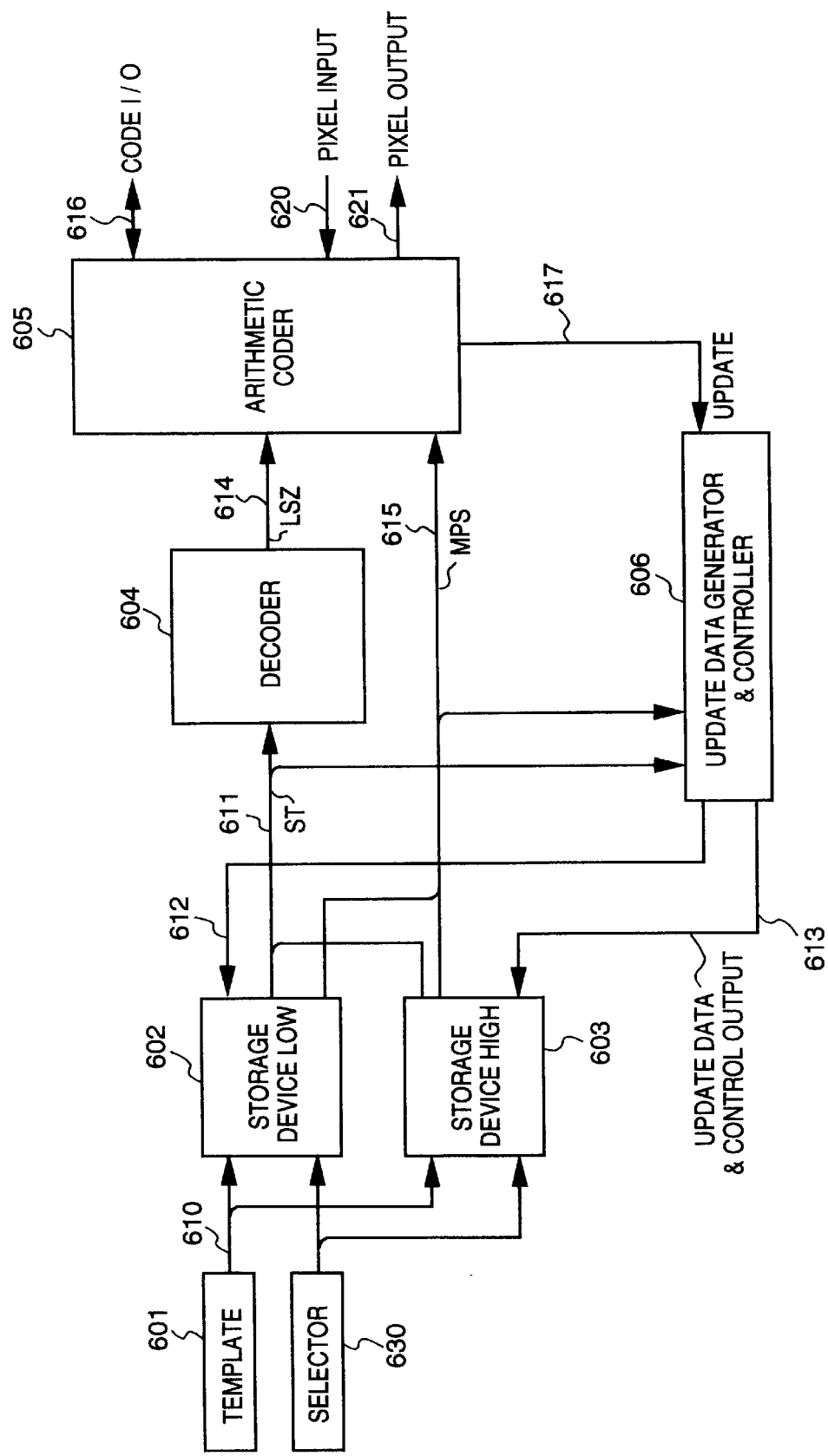
FIG. 21 is a block diagram showing the configuration of a coding/decoding apparatus according to the sixth embodiment of the present invention.

FIG. 21 is a block diagram showing the configuration of a coding/decoding apparatus according to this embodiment. Referring to FIG. 21, a storage device (low) 602 and a storage device (high) 603 store prediction states of reference pixels. These storage devices 602 and 603 are selected by a selector 630 which is a mechanism provided to perform this selection. A template 601 is divided into groups in accordance with a certain appropriate rule, and these groups are connected to addresses of the two separate storage devices 602 and 603.

A decoder 604 converts a prediction state value, ST 611, into an estimation (occurrence) probability (LSZ) 614. An arithmetic coder 605 adaptively performs coding by using the LSZ 614 as the occurrence probability of a pixel to be coded and MPS 615 as the prediction symbol of that pixel. More specifically, the arithmetic coder 605 performs coding on the basis of the LSZ 614, the MPS 615, and a pixel input 620 and properly outputs the code to a code I/O 616. In performing decoding, the arithmetic coder 605 performs decoding on the basis of the LSZ 614, the MPS 615, and the code I/O 616 and outputs a decoded pixel 621 as a pixel output.

If it is necessary to update the prediction state value during the course of the above processing, the arithmetic coder 605 outputs an update request signal, UPDATE 617, to an update data generator & controller 606. The update data generator & controller 606 generates update data on the basis of the ST 611 and the MPS 615, and outputs the update data together with a control signal for rewriting the storage devices 602 and 603 as update data & control signals 612 and 613.

The operation of coding in this embodiment will be described below.

Figure 23:
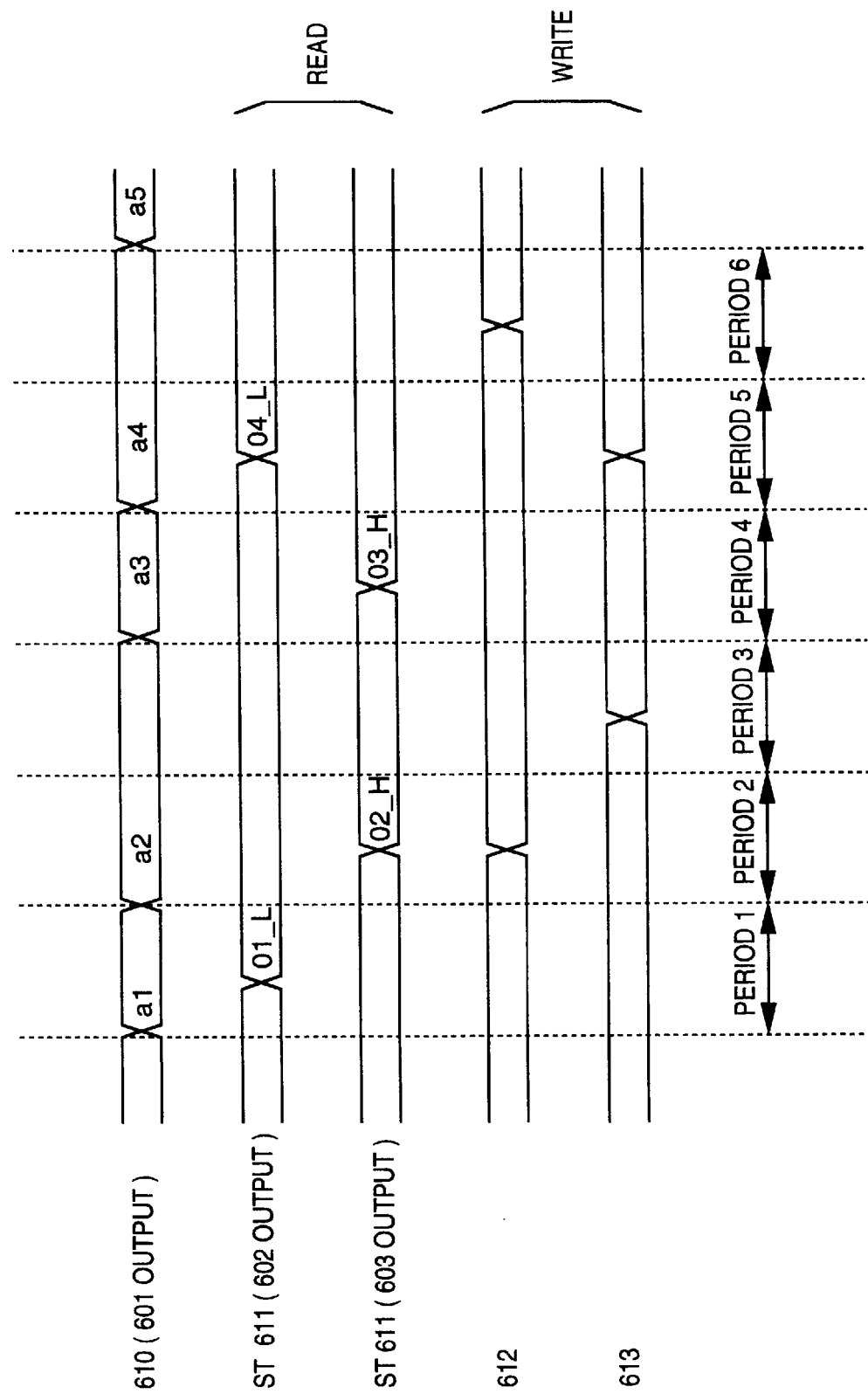
FIG. 23 is a timing chart showing the operation of coding according to the sixth embodiment.
Figure 24:
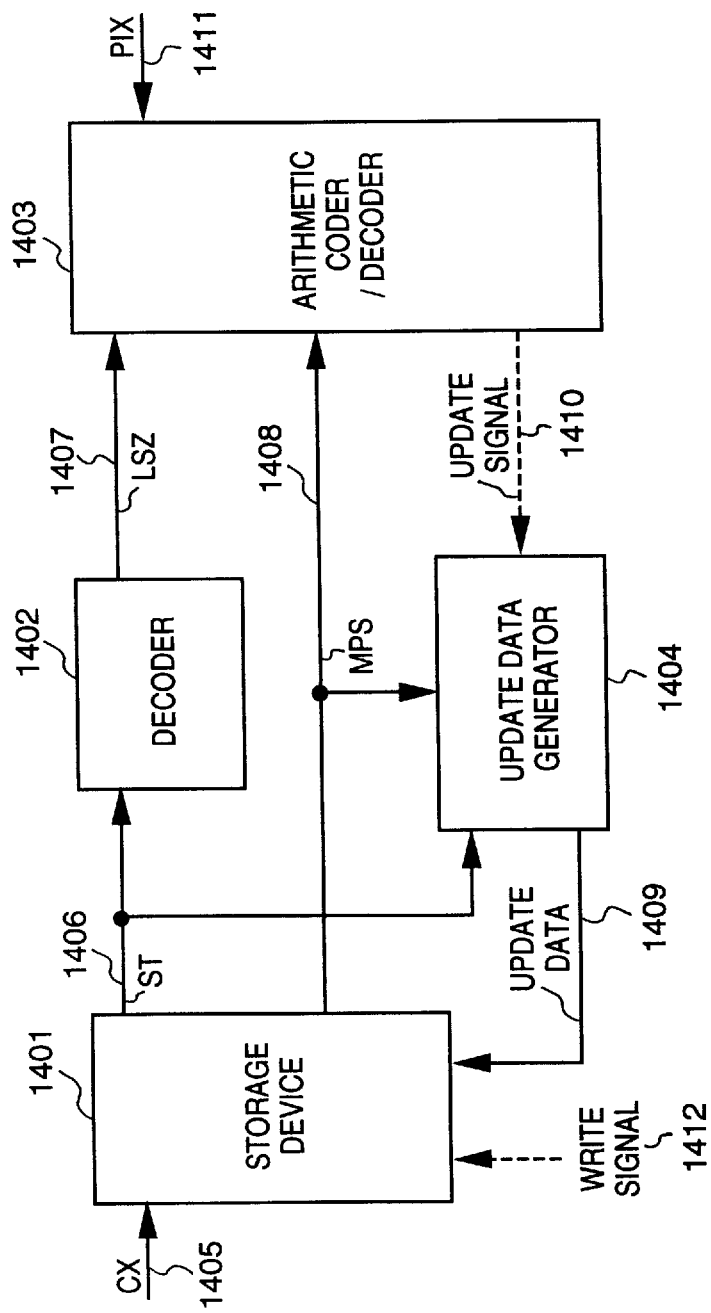
FIG. 24 is a block diagram showing the configuration of a conventional image processor.
Figure 25:
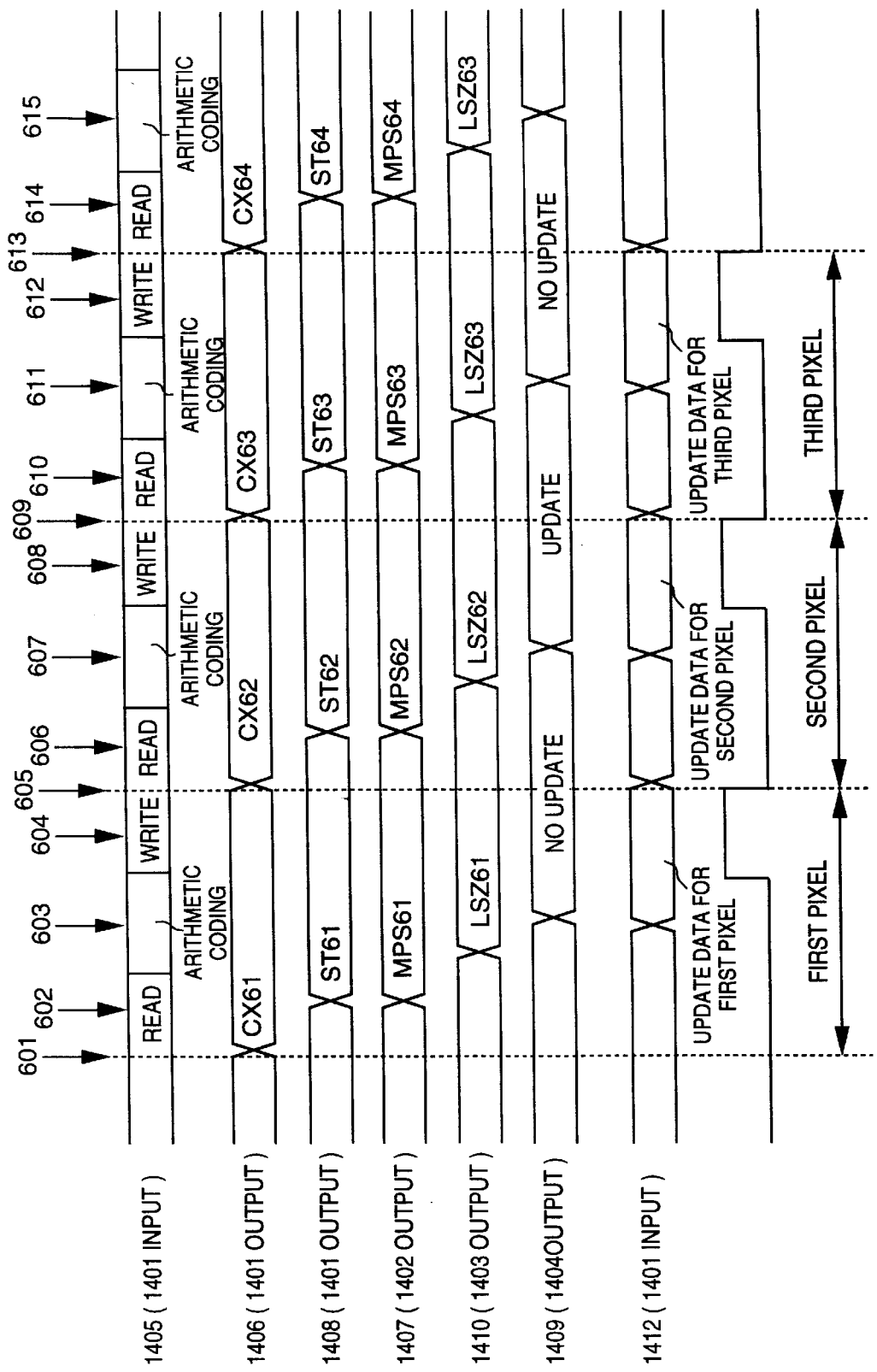
FIG. 25 is a timing chart showing conventional pixel processing.

FIG. 23 is a timing chart showing the coding operation of the coding/decoding apparatus according to this embodiment.

In the case of the template as shown in FIG. 22, there exist 1024 different prediction states as described previously. Assume, for example, that one of the storage devices 602 and 603 is selected by the selector 630 in accordance with "1" or "0" of the pixel 308 shown in FIG. 22, and an output from one of the storage devices 602 and 603 is delivered as the ST 611 and the MPS 615. Note that each storage device can store 512 different prediction states.

If the value generated by the template 601 at the beginning of period 1 in FIG. 23 is a1, the template 601 is divided into groups by this address input. For example, when the pixel 308 in FIG. 22 is "0" and the storage device 602 is selected, a prediction state value o1_L is output as the ST 611. The decoder 604 converts this value o1_L into the LSZ 614 and inputs the LSZ 614 to the arithmetic coder 605.

Thereafter, the arithmetic coder 605 appropriately outputs a coded value (616). If a prediction state value update request signal 617 is output during a series of these processing steps, the corresponding update data shown with a reference numeral 612 in FIG. 23 is written in accordance with the read address of the storage device 602 during period 2 in FIG. 23.

At the beginning of the period 2, group division is again performed by a value (assuming this value is a2) generated from the next reference pixel by the template 601. That is, when the pixel 308 in FIG. 22 is "1" and the storage device 603 is selected, a prediction state value can be read out from the storage device 603 even if a write is being performed for the storage device 602, since the storage device 603 is independent of the storage device 602. Assume the readout value is o2_H as shown in FIG. 23.

As in the case described previously, the decoder 604 converts o2_H into the LSZ 614 and inputs the LSZ 614 to the arithmetic coder 605. The coded value is properly output as the code I/O 616. If update request for a prediction state value is output, the update data is written in the read address of the storage device 603 during period 3 in FIG. 23.

When the next reference pixel is output by the template 601 (assume this value is a3), group division is again performed. If the pixel 308 in FIG. 22 is again "1", however, the storage device 603 is selected. In the period 3, the prediction state update data of the preceding pixel to be processed is being written in the storage device 603. Therefore, it is not possible to read out the prediction state value of the current pixel to be processed.

Accordingly, data in the address a3 of the storage device 603 can be read out in period 4. In this manner the processing is repetitively executed.

Note that the number of bits constituting the LSZ 614 is generally larger than the number of bits constituting the ST 611, and so the decoder 604 is interposed to decrease the circuit scale. However, the above operation is not at all affected even when the LSZ is directly stored in the storage device.

In the sixth embodiment as described above, templates constituted by reference pixels are assigned to addresses of a plurality of separate storage devices. A current template differs from a template used in coding of a preceding pixel, and the individual templates are used as addresses of different storage devices. Accordingly, a prediction state value of the current pixel to be processed can be read out at the same time update data of the preceding pixel to be processed is written. That is, to each of a plurality of separate storage means for storing prediction state values, an address is assigned. Consequently, while data is being written in one storage means, data can be read out from the other storage means. This allows a simple circuit configuration to improve the efficiency of coding/decoding processing and the operating speed of the apparatus.

Note that the number of bits constituting a template, the method of division, the number of divided parts, and the method of selecting a storage device are not limited to those in the above embodiment, and some other methods also can be used.

<Seventh Embodiment>

Figure 26:
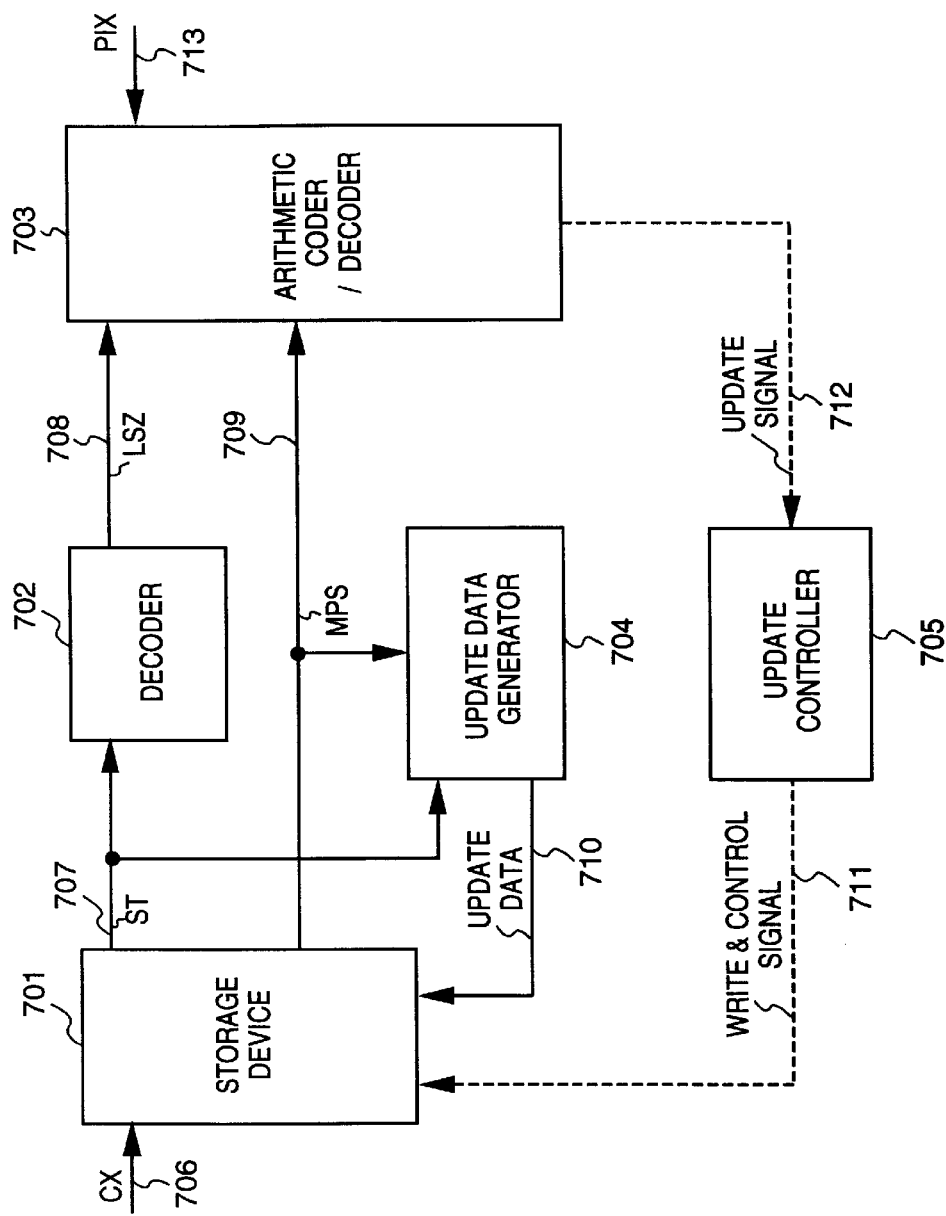
FIG. 26 is a block diagram showing the configuration of an image processor according to the seventh embodiment of the present invention.
Figure 27:
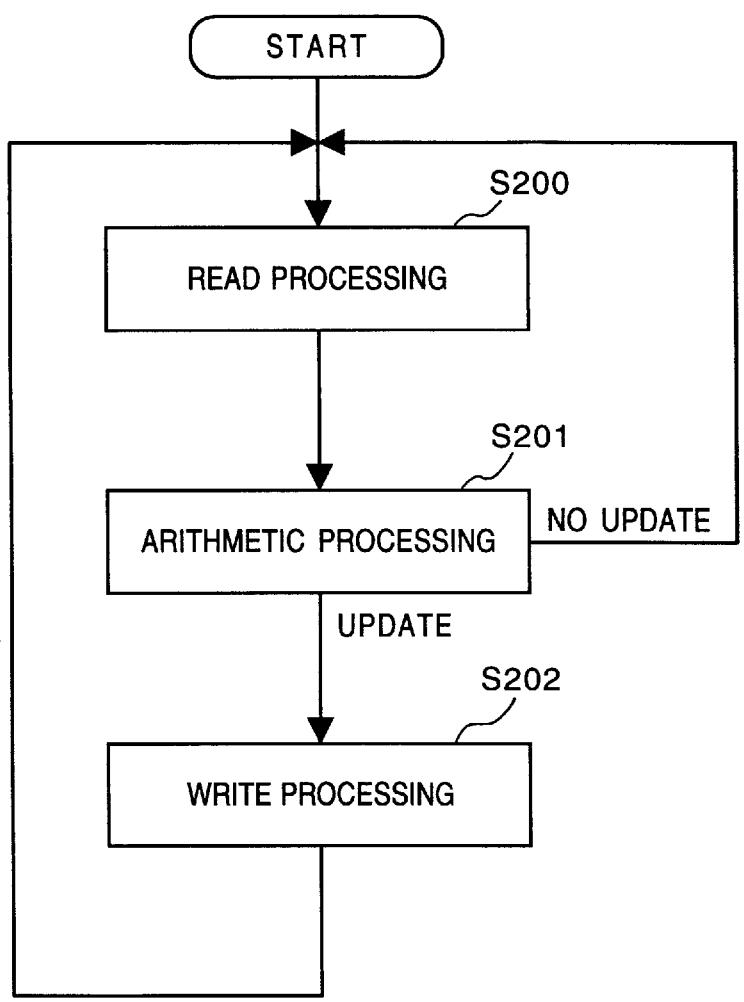
FIG. 27 is a flow chart showing the procedure of the processor according to the seventh embodiment.

FIG. 26 is a block diagram showing the configuration of an image processing apparatus according to the seventh embodiment. FIG. 27 is a flow chart showing the procedure of the apparatus of this embodiment, and FIG. 28 shows an operation timing chart of the apparatus.

As illustrated in FIG. 27, the apparatus according to this embodiment executes READ processing (step S200) and arithmetic processing (step 201) for each pixel. The apparatus checks in step S201 whether update processing is necessary. If the update processing is necessary, the apparatus performs WRITE processing in step S202. If the update processing is unnecessary, the apparatus commences READ processing (step S200) for the next pixel by omitting WRITE processing (step S202).

The processing of the apparatus according to this embodiment will be described below by taking sequential coding as an example. Note that a template in this embodiment has the same arrangement as that of the template illustrated in FIG. 22.

In the apparatus shown in FIG. 26, CX 706 as an address is input to a storage device 701 in order to read out an estimation value of each pixel. ST 707 as a prediction state value and MPS 709 as a prediction symbol are read out from the storage device 701. The ST 707 is applied to a decoder 702 and an update data generator 704. The MPS 709 is applied to the update data generator 704 and an arithmetic coder/decoder 703.

The decoder 702 converts the input ST 707 into LSZ 708 as an occurrence probability. To the arithmetic coder/decoder 703, the LSZ 708, the MPS 709, and PIX 713 as a pixel to be coded are input. The arithmetic coder/decoder 703 performs coding on the basis of the LSZ 708, the MPS 709, and the PIX 713 and also outputs an update signal 712.

This update signal 712 is input to an update controller 705. The update data generator 704 outputs update data 710 each time a pixel is coded. The update data 710 is written in the storage device 701 by a WRITE & control signal 711 for the storage device 701 only when the contents of the storage device 701 need to be updated.

If the contents of the storage device 701 need not be updated, the next pixel CX is written in as an address, to the storage device 701 by the WRITE & control signal 711.

The operation of the apparatus according to this embodiment will be described below with reference to the timing chart in FIG. 29 by taking a case where the first pixel requires "update" and the second pixel requires "no update" as an example.

<Processing for first pixel>

At time 301 in FIG. 29, read processing (READ) 302 for the storage device 701 is started, and CX31 necessary for coding of the first pixel is input to the storage device 701. ST31 and MPS31 are read out from the storage device 701. The decoder 702 converts the ST31 into LSZ31 and inputs the LSZ31 to the arithmetic coder/decoder 703.

On the basis of the LSZ31, the MPS31, and PIX31, the arithmetic coder/decoder 703 performs arithmetic coding 303 and outputs the update signal 712 to the update controller 705. Since the pixel currently being processed requires "no update" as shown in FIG. 28, the update data generator 704 outputs the ST31 and the MPS31 as the update data 710, but nothing is written in the storage device 701 by the WRITE & control signal 711.

<Processing for second pixel>

At time 304 at which coding of the first pixel requiring no update is completed, second pixel read processing (READ) 305 is started by the WRITE & control signal 711. That is, CX32 as a reference pixel value required to code the second pixel is input to the storage device 701. ST32 and MPS32 are read out from the storage device 701.

The decoder 702 converts the ST32 into LSZ32 and inputs the LSZ32 to the arithmetic coder/decoder 703. On the basis of the LSZ32, the MPS32, and PIX32, the arithmetic coder/decoder 703 performs arithmetic coding 306 and outputs the update signal 712 to the update controller 705.

Since the pixel currently being processed requires "update" as shown in FIG. 28, the update data generator 704 generates and outputs the update data 710 to the storage device 701. This update signal 710 is written in the storage device 701 during a WRITE processing period 307 by the WRITE & control signal 711 (which performs a write action at logic level HIGH).

The processing is repeated in the same fashion as described above. That is, if no update processing is to be performed for the storage device 701, as in the case of the first pixel, the update data 710 is not written in the storage device 701 by the WRITE & control signal 711. Instead, the next pixel CX is written in as an address, to the storage device 701.

If the contents of the storage device 701 are to be updated, as in the case of the second pixel, the update data generator 704 newly generates update data 711 and writes the data in the storage device 701.

As described above, in this embodiment whether update is to be performed is checked for each pixel. If a storage device need not be updated or rewritten, a write processing period is omitted and processing for the succeeding pixel is started. Consequently, the processing time can be shortened.

More specifically, the coding/decoding time when no update processing is performed is substantially one-half the processing time when update processing is performed. In particular, since simple binary images need not be updated so often, the coding/decoding time can be greatly shortened. This makes image processing at a higher speed feasible.

The gist of the present invention is that when no update processing is performed for a storage device, a write processing period for the storage device is omitted and processing for the next pixel is started, thereby reducing the pixel processing time. Therefore, whether the processing is hierarchical coding or decoding makes no difference in the effect of the present invention.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

As many apparently widely different embodiments of the present invention can be made without departing from the spirit and scope thereof, it is to be understood that the invention is not limited to the specific embodiments thereof except as defined in the appended claims.

What is claimed is:

1. A coding apparatus comprising:

generating means for generating an address by referring to a plurality of pixels in a predetermined template;

storage means for storing occurrence probabilities of a target pixel and outputting an occurrence probability based on the address generated by said generating means, said storage means consisting of a plurality of memory banks which store different occurrence probabilities from each other;

coding means for coding a target pixel based on an occurrence probability output from one of the plurality of memory banks of said storage means; and updating means for updating an occurrence probability stored in one of the plurality of memory banks based on a coding result of said coding means, wherein when a memory bank to be updated is different from a memory bank from which an occurrence probability is to be output, a first occurrence probability is output while a second occurrence probability is being updated.

2. A coding apparatus according to claim 1, wherein when a memory bank to be updated is same as a memory bank from which an occurrence probability is to be output, an occurrence probability is output after an occurrence probability is updated.

3. A coding apparatus according to claim 1, further comprising determining means for determining whether or not a memory bank to be updated is different from a memory bank from which an occurrence probability is to be output.

4. A coding apparatus according to claim 1, wherein said generating means refers to a plurality of pixels near a target pixel.

5. A coding apparatus according to claim 1, wherein said coding means codes a target pixel using an arithmetic coding.

6. A coding method comprising:

a generating step of generating an address by referring to a plurality of pixels in a predetermined template;

an outputting step of outputting an occurrence probability of a target pixel from a storage device based on the address generated in said generating step, the storage device consisting of a plurality of memory banks which store different occurrence probabilities from each other;

a coding step of coding a target pixel based on an occurrence probability output from one of the plurality of memory banks of the storage device; and an updating step of updating an occurrence probability stored in one of the plurality of memory banks based on a coding result obtained in said coding step, wherein when a memory bank to be updated is different from a memory bank from which an occurrence probability is to be output, a first occurrence probability is output while a second occurrence probability is being updated.

7. A coding method according to claim 6, wherein when a memory bank to be updated is same as a memory bank from which an occurrence probability is to be output, an occurrence probability is output after an occurrence probability is updated.

8. A coding method according to claim 6, further comprising a determining step of determining whether or not a memory bank to be updated is different from a memory bank from which an occurrence probability is to be output.

9. A coding method according to claim 6, wherein, in said generating step, a plurality of pixels near a target pixel are referred to.

10. A coding method according to claim 6, wherein, in said coding step, a target pixel is coded using an arithmetic coding.

11. A decoding apparatus comprising:

generating means for generating an address by referring to a plurality of pixels in a predetermined template;

storage means for storing occurrence probabilities of a target pixel and outputting an occurrence probability based on the address generated by said generating means, said storage means consisting of a plurality of memory banks which store different occurrence probabilities from each other;

decoding means for decoding a target pixel based on an occurrence probability output from one of the plurality of memory banks of said storage means; and updating means for updating an occurrence probability stored in one of the plurality of memory banks based on a decoding result of said decoding means, wherein when a memory bank to be updated is different from a memory bank from which an occurrence probability is to be output, a first occurrence probability is output while a second occurrence probability is being updated.

12. A decoding apparatus according to claim 11, wherein, when a memory bank to be updated is same as a memory bank from which an occurrence probability is to be output, an occurrence probability is output after an occurrence probability is updated.

13. A decoding apparatus according to claim 11, further comprising determining means for determining whether or not a memory bank to be updated is different from a memory bank from which an occurrence probability is to be output.

14. A decoding apparatus according to claim 11, wherein said generating means refers to a plurality of pixels near a target pixel.

15. A decoding apparatus according to claim 11, wherein said decoding means decodes a target pixel using an arithmetic coding.

16. A decoding method comprising:
  a generating step of generating an address by referring to a plurality of pixels in a predetermined template;
  an outputting step of outputting an occurrence probability of a target pixel from a storage device based on the address generated in said generating step, the storage device consisting of a plurality of memory banks which store different occurrence probabilities from each other;
  a decoding step of decoding a target pixel based on an occurrence probability output from one of the plurality of memory banks of the storage device; and
  an updating step of updating an occurrence probability stored in one of the plurality of memory banks based on a decoding result obtained in said decoding step, wherein when a bank to be updated is different from a memory bank from which an occurrence probability is to be output, a first occurrence probability is output while a second occurrence probability is being updated.

17. A decoding method according to claim 16, wherein when a memory bank to be updated is same as a memory bank from which an occurrence probability is to be output, an occurrence probability is output after an occurrence probability is updated.

18. A decoding method according to claim 16, further comprising a determining step of determining whether or not a memory bank to be updated is different from a memory bank from which an occurrence probability is to be output.

19. A decoding method according to claim 16, wherein, in said generating step, a plurality of pixels near a target pixel are referred to.

20. A decoding method according to claim 16, wherein, in said decoding step, a target pixel is decoded using an arithmetic coding.

21. A decoding apparatus comprising:
  generating means for generating an address for each of a plurality of target pixels to be decoded by referring to a plurality of pixels near the target pixel to be decoded in a template, wherein the template alternates between a first template and a second template which is different from the first template for successive target pixels, and wherein the first and second templates indicate a plurality of pixel positions excluding a pixel position of a preceding pixel of the target pixel to be decoded;
  first storage means for storing occurrence probabilities of a target pixel for which the preceding pixel has a predetermined value and for outputting an occurrence probability based on an address generated by referring to the plurality of pixels in the first template;
  second storage means for storing occurrence probabilities of a target pixel for which the preceding pixel does not have the predetermined value and for outputting an occurrence probability based on an address generated by referring to the plurality of pixels in the first template;
  third storage means for storing occurrence probabilities of a target pixel for which the preceding pixel has the predetermined value and for outputting an occurrence probability based on an address generated by referring to the plurality of pixels in the second template;
  fourth storage means for storing occurrence probabilities of a target pixel for which the preceding pixel does not have the predetermined value and for outputting an occurrence probability based on an address generated by referring to the plurality of pixels in the second template;
  selecting means for selecting one of said first, second, third and fourth storage means based on whether said generating means refers to the plurality of pixels in the first template or the second template and based on whether the preceding pixel has the predetermined value or not; and
  decoding means for decoding a target pixel based on an occurrence probability output from the one of said first, second, third and fourth storage means selected by said selecting means.

22. A decoding apparatus according to claim 21, further comprising updating means for updating an occurrence probability stored in one of said first, second, third and fourth storage means.

23. A decoding apparatus according to claim 22, wherein said decoding means decodes a target pixel based on an occurrence probability output from one of said first, second, third and fourth storage means while said updating means is updating an occurrence probability stored in an other of said storage means.

24. A decoding apparatus according to claim 21, wherein said generating means refers to a plurality of reduced pixels in addition to a plurality of pixels near a target pixel.

25. A decoding apparatus according to claim 21, wherein said decoding means decodes a target pixel using an arithmetic coding.

26. A decoding method comprising:
  a generating step of generating an address for each of a plurality of target pixels to be decoded by referring to a plurality of pixels near the target pixel to be decoded in a template, wherein the template alternates between a first template and a second template which is different from the first template for successive target pixels, and wherein the first and second templates indicate a plurality of pixel positions excluding a pixel position of a preceding pixel of the target pixel to be decoded;
  a first outputting step of outputting an occurrence probability of a target pixel from a first storage device based on an address generated by referring to a plurality of pixels in the first template, the first storage device storing occurrence probabilities of a target pixel for which the preceding pixel has a predetermined value;
  a second outputting step of outputting an occurrence probability of a target pixel from a second storage device based on an address generated by referring to a plurality of pixels in the first template, the second storage device storing occurrence probabilities of a target pixel for which the preceding pixel does not have the predetermined value;
  a third outputting step of outputting an occurrence probability of a target pixel from a third storage device based on an address generated by referring to a plurality of pixels in the second template, the third storage device storing occurrence probabilities of a target pixel for which the preceding pixel has the predetermined value;

a fourth outputting step of outputting an occurrence probability of a target pixel from a fourth storage device based on an address generated by referring to a plurality of pixels in the second template, the fourth storage device storing occurrence probabilities of a target pixel for which the preceding pixel does not have the predetermined value;

a selecting step of selecting one of the first, second, third and fourth storage devices based on whether said generating step refers to the plurality of pixels in the first template or the second template and based on whether the preceding pixel has the predetermined value or not; and a decoding step of decoding a target pixel based on an occurrence probability output from the one of the first, second, third and fourth storage devices selected in said selecting step.

27. A decoding method according to claim 26, further comprising an updating step of updating an occurrence probability stored in one of the first, second, third and fourth storage devices.

28. A decoding method according to claim 27, wherein, in said decoding step, a target pixel is decoded based on an occurrence probability output from one of the first, second, third and fourth storage devices while said updating step is updating an occurrence probability stored in an other storage device.

29. A decoding method according to claim 26, wherein, in said generating step, a plurality of reduced pixels in addition to a plurality of pixels near a target pixel are referred to.

30. A decoding method according to claim 26, wherein, in said decoding step, a target pixel is decoded using an arithmetic coding.

* * * * *

UNITED STATES PATENT AND TRADEMARK OFFICE
CERTIFICATE OF CORRECTION

PATENT NO.   : 5,848,194

DATED        : December 8, 1998

INVENTOR(S)  : KEIJI ISHIZUKA ET AL.

It is certified that errors appear in the above-identified patent and that said Letters Patent is hereby corrected as shown below:

COLUMN 8

Line 62, "2041a" should read --204a--.

COLUMN 11

Line 6, "PH1_1o1_H," should read --PH1_o1_H,--.

Signed and Sealed this

Nineteenth Day of October, 1999

Attest:

Q. TODD DICKINSON

*Attesting Officer*          *Acting Commissioner of Patents and Trademarks*